(12) United States Patent
Kakegawa

(10) Patent No.: US 8,917,412 B2
(45) Date of Patent: Dec. 23, 2014

(54) SYSTEM, APPARATUS AND METHOD FOR CONSUMPTION MANAGEMENT

(75) Inventor: Ienobu Kakegawa, Franklin Lakes, NJ (US)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 13/161,927

(22) Filed: Jun. 16, 2011

(65) Prior Publication Data

US 2012/0320410 A1 Dec. 20, 2012

(51) Int. Cl.
*G06K 15/00* (2006.01)
*G06F 3/12* (2006.01)
*G06K 15/02* (2006.01)

(52) U.S. Cl.
CPC ............ *G06F 3/1256* (2013.01); *G06K 15/407* (2013.01); *G06K 15/4065* (2013.01); *G06F 3/1244* (2013.01); *G06K 15/1823* (2013.01); *Y02B 60/1271* (2013.01); *G06F 3/1219* (2013.01); *G06F 3/1285* (2013.01)
USPC ....................................................... 358/1.15

(58) Field of Classification Search
USPC ................................................ 358/1.14, 1.15
See application file for complete search history.

(56) References Cited

U.S. PATENT DOCUMENTS

| | | | |
|---|---|---|---|
| 7,542,437 B1* | 6/2009 | Redi et al. ..................... | 370/311 |
| 2004/0246512 A1* | 12/2004 | Miyamoto .................... | 358/1.13 |
| 2008/0306985 A1* | 12/2008 | Murray et al. ................. | 707/102 |
| 2010/0050175 A1* | 2/2010 | Jung et al. ..................... | 718/100 |
| 2011/0317200 A1* | 12/2011 | Honda et al. .................. | 358/1.14 |

* cited by examiner

*Primary Examiner* — Qian Yang
(74) *Attorney, Agent, or Firm* — Cooper & Dunham LLP

(57) ABSTRACT

Apparatuses, systems and methods are provided for monitoring the consumption of paper, toner, energy, other resources, etc., by an information technology device, and for encouraging a user to reduce consumption of such resources when using the information technology device.

18 Claims, 33 Drawing Sheets

USER INTERFACE SCREEN

Please Select Print Job:

| Print Job Name | No. of Pages |
|---|---|
| DataReport145.doc | 12 |
| Presentation4.ppt | 6 |
| JohnSmithOutline.doc | 8 |
| NewAgreement3-28-11.doc | 47 |
| --- | --- |
| --- | --- |
| --- | --- |
| --- | --- |
| --- | --- |

Select Print Job Settings:

- ● Simplex (one-sided)
- ○ Duplex (two-sided)
- ○ Color
- ● Monochrome
- ○ Combine Pages
  - ↳ Pages Per Sheet:  1 page per sheet

SUBMIT

Fig. 3

| No. of Pages in Ouput Job | PAPER CONSUMPTION AMOUNT | | | | | | | |
|---|---|---|---|---|---|---|---|---|
| | Simplex Mode | | | | Duplex Mode | | | |
| | Un-combined | Combined (2 pages per sheet) | Combined (4 pages per sheet) | Combined (6 pages per sheet) | Un-combined | Combined (2 pages per sheet) | Combined (4 pages per sheet) | Combined (6 pages per sheet) |
| 1 | 1 | 1 | 1 | 1 | 1 | 1 | 1 | 1 |
| 2 | 2 | 1 | 1 | 1 | 1 | 1 | 1 | 1 |
| 3 | 3 | 2 | 1 | 1 | 2 | 1 | 1 | 1 |
| 4 | 4 | 2 | 1 | 1 | 2 | 2 | 1 | 1 |
| 5 | 5 | 3 | 2 | 1 | 3 | 2 | 1 | 1 |
| 6 | 6 | 3 | 2 | 1 | 3 | 2 | 1 | 1 |
| 7 | 7 | 4 | 2 | 2 | 4 | 2 | 1 | 1 |
| 8 | 8 | 4 | 2 | 2 | 4 | 3 | 2 | 1 |
| 9 | 9 | 5 | 3 | 2 | 5 | 3 | 2 | 1 |
| 10 | 10 | 5 | 3 | 2 | 5 | 3 | 2 | 1 |
| ... | ... | ... | ... | ... | ... | ... | ... | ... |

Fig. 4

| No. of Pages in Ouput Job | TONER CONSUMPTION AMOUNT | | | | | | | |
|---|---|---|---|---|---|---|---|---|
| | Simplex Mode | | | | Duplex Mode | | | |
| | Un-combined | Combined (2 pages per sheet) | Combined (4 pages per sheet) | Combined (6 pages per sheet) | Un-combined | Combined (2 pages per sheet) | Combined (4 pages per sheet) | Combined (6 pages per sheet) |
| 1 | c1 | c12 | c14 | c16 | c10 | c102 | c104 | c106 |
| 2 | c2 | c22 | c24 | c26 | c20 | c202 | c204 | c206 |
| 3 | c3 | c32 | c34 | c36 | c30 | c302 | c304 | c306 |
| 4 | c4 | c42 | c44 | c46 | c40 | c402 | c404 | c406 |
| 5 | c5 | c52 | c54 | c56 | c50 | c502 | c504 | c506 |
| ... | ... | ... | ... | ... | ... | ... | ... | ... |

Fig. 5

| No. of Pages in Ouput Job | REQUIRED TIME TO PERFORM OUTPUT JOB | | | | | | |
|---|---|---|---|---|---|---|---|
| | Simplex Mode | | | | Duplex Mode | | |
| | Un-combined | Combined (2 pages per sheet) | Combined (4 pages per sheet) | Combined (6 pages per sheet) | Un-combined | Combined (2 pages per sheet) | Combined (4 pages per sheet) | Combined (6 pages per sheet) |
| 1 | t1 | t12 | t14 | t16 | t10 | t102 | t104 | t106 |
| 2 | t2 | t22 | t24 | t26 | t20 | t202 | t204 | t206 |
| 3 | t3 | t32 | t34 | t36 | t30 | t302 | t304 | t306 |
| 4 | t4 | t42 | t44 | t46 | t40 | t402 | t404 | t406 |
| 5 | t5 | t52 | t54 | t56 | t50 | t502 | t504 | t506 |
| ... | ... | ... | ... | ... | ... | ... | ... | ... |

Did you know that by
outputting this print job in
*Combined Page Mode (4 pages/sheet)*,
you could save *7 sheets of paper?*

LEARN MORE

Fig. 6A

If you output this copy job
in *Duplex Mode,*
you could save *20 seconds*
of printing time!

LEARN MORE

Fig. 6B

Did you know that by
outputting this print job in
*Combined Page Mode (8 pages/sheet)*,
you could save *50% of ink*?

LEARN MORE

Fig. 6C

If you output this copy
job in *Duplex Mode*,
you would only use *50 sheets of paper*
instead of *100 sheets of paper*!

LEARN MORE

Fig. 6D

USER INTERFACE SCREEN

In order to output this *10 page document* using the original job settings of *Simplex Mode, 10 sheets of paper* will be required.

If you output this *10 page document* using:

| ☑ Simplex Mode | ☑ No combined pages |
| Duplex Mode | Combined pages (2 pages/sheet) |
| | Combined pages (4 pages/sheet) |
| | Combined pages (6 pages/sheet) |

Then only [ 3 sheets of paper ] will be required!

Would you like to change your job settings to the new settings selected above, or keep your original settings?

[ CHANGE SETTINGS ]  [ USE ORIGINAL SETTINGS ]

[ Preview New Settings ]

| USAGE HISTORY INFORMATION | | | |
|---|---|---|---|
| User | Usage History Log | | |
| | Month 1 | Month 2 | Month 3 |
| John Smith | 75 | 7 | 8 |
| Jane Doe | 456 | 43 | 13 |
| Jim Alpha | 78 | 54 | 64 |
| Charlie Beta | 36 | 97 | 44 |
| Jeremy Tango | 1 | 35 | 99 |
| ... | ... | ... | ... |
| ... | ... | ... | ... |
| Average | 50 | 49 | 36 |

Did you know that your paper consumption in the past month is *50% greater* than the average for all users in your department?

Congratulations! In January you were ranked *2 out of 100* in our office in terms of reducing paper consumption!

Did you know that your paper
consumption in June was *72% greater*
than your paper consumption in July?

LEARN MORE

Fig. 16C

This month you have consumed
$1/3^{rd}$ *less* paper than you consumed last month!
Congratulations!

LEARN MORE

Fig. 16D

USER INTERFACE SCREEN

Select Apparatus Settings:

- ● Simplex (one-sided)
- ○ Duplex (two-sided)
- ○ Color
- ● Monochrome
- ○ Combine Pages
  - ↳ Pages Per Sheet: [▽ 1 page per sheet]
- ● Draft Quality
- ○ Normal Quality
- ○ Best Quality

[SUBMIT]

| Setting | Power Consumed (units/year) | | |
| --- | --- | --- | --- |
| | 30 jobs/day | 60 jobs/day | 120 jobs/day |
| Simplex | 6 | 5 | 4 |
| Duplex | 34 | 25 | 8 |
| Combine – 2 pages/sheet | 67 | 8 | 14 |
| Combine – 4 pages/sheet | 24 | 45 | 23 |
| Combine – 6 pages/sheet | 3 | 61 | 1 |
| Monochrome | ... | ... | ... |
| Color | ... | ... | ... |
| Draft Quality | ... | ... | ... |
| Normal Quality | ... | ... | ... |
| Best Quality | ... | ... | ... |

WARNING

By using the current apparatus settings that include *Draft Quality* mode, the power consumption is *5 units per year*. (Assuming 120 jobs/day)

By switching to proposed new settings including *Best Quality* mode, the power consumption will increase to *40 units per year*! (Assuming 120 jobs/day)

Would you like to change the apparatus settings, or keep the current apparatus settings?

| CHANGE SETTINGS | KEEP ORIGINAL SETTINGS |

SYSTEM, APPARATUS AND METHOD FOR CONSUMPTION MANAGEMENT

TECHNICAL FIELD

This disclosure relates to systems, apparatuses, methodologies, computer program products, etc., for monitoring the consumption of paper, toner, energy and other resources by an information technology device.

BACKGROUND

In the current information age, information technology (IT) tools are extensively used in enterprises and other organizations in order to facilitate processing of documents and data. For example, IT assets such as computers, printers, plotters, copiers, scanners, multi-function devices (MFDs) and other network-connected or standalone devices can be used in connection with printing, copying, scanning, facsimile, and other types of jobs.

IT management tools (such as management application software) are available to assist IT administrators with administering and monitoring such IT devices. For example, the IT administrator may receive monthly reports including consumption and usage history of the IT devices (indicating, for example, the total amount of pages printed by each device).

There is a drawback, however, in that such consumption and usage history information is provided only to the IT administrators that manage the devices, and is not provided to users that request copy jobs, print jobs and other types of jobs performed by the IT devices. Thus, the actual users of the IT devices are generally unaware of the amount of paper, toner, energy and so forth, that are consumed when using the IT devices, and as a result the users may become unconcerned with efforts to conserve paper, toner, energy and other resources, when using the IT devices.

There exists a need for an improved approach for monitoring paper, toner and/or energy consumption of an information technology device, and for encouraging a user to reduce consumption of paper, toner, energy and other resources, when using the information technology device.

SUMMARY

In an aspect of this disclosure, there is provided a tool (for example, an apparatus, application software, etc.) for monitoring the consumption of energy, paper, toner and other resources of an information technology device, and for encouraging a user to reduce the consumption of energy, paper, toner or other resources, when the user uses the information technology device.

For example, when a request to perform a specific job and job settings corresponding to the specific job is received, the tool determines resource consumption (for example, paper consumption amount, toner consumption amount, output time amount, etc.) associated with the specific job, based on the received job and job settings, and determines whether there are alternative settings that would lead to savings of resources (e.g., paper, toner, energy, output time, etc.). If such alternative settings are available, the apparatus preferably outputs a message indicating to the user said alternative settings and that the alternative job settings would lead to savings of identified resources.

In another aspect, when a user specifies, through the user interface, job settings for an output job, the processing part calculates and displays paper consumption amount, toner consumption amount, output time amount, etc., based on the job settings specified by the user.

In another aspect, when a particular user submits a specific job, a processing part determines a user-specific consumption level based on historical usage of resources by the particular user and determines an average consumption level based on usage history of a plurality of users, and a message comparing the user-specific consumption level to the average consumption level is output.

In another aspect, when a particular user submits a specific job, a message summarizing usage history of the particular user and summarizing average usage history of a plurality of users is output. For example, a graphical chart comparing the usage history of the particular user and the average usage history of the plurality of users may be output.

In another aspect, when a particular user submits a specific job, a processing part determines a first user-specific consumption level based on usage history of the particular user in a first time period and determines a second user-specific consumption level based on usage history of the particular user in a second time period, and a message comparing the first user-specific consumption level to the second user-specific consumption level is displayed.

In another aspect of this disclosure, a user interface is configured for a user to request a change of current settings of the job processing apparatus to other settings for the apparatus. When the user requests the change of the current settings to said other job settings, the processing part determines whether there is an increase in power to be consumed in a case that the job processing apparatus operates based on said other job settings, as compared to that in a case that the job processing apparatus operates based on the current job settings. If the processing part determines that said other settings cause an increase in power consumption, the processing part, before applying the user-specified other settings, causes the user interface part to output a warning message indicating that changing to said other settings requested by the user will cause greater consumption of power as compared to the current settings In another aspect, a user request for changing a current sleep mode setting to a new sleep mode setting is received, and electricity consumption comparison data (indicating electricity consumption information corresponding to the current sleep mode setting and electricity consumption information corresponding to the new sleep mode setting) is generated and displayed.

In another aspect, a user request for changing a current sleep mode setting to a new sleep mode setting is received, and electricity cost comparison data (indicating electricity cost information corresponding to the current sleep mode setting and electricity cost information corresponding to the new sleep mode setting) is generated and displayed.

BRIEF DESCRIPTION OF THE DRAWINGS

The aforementioned and other aspects, features and advantages can be more readily understood from the following detailed description with reference to the accompanying drawings wherein:

FIG. 3 shows an example of a table registering paper consumption amount information managed and maintained by a document processing apparatus or part, such as document processing apparatus 100 depicted in FIG. 1A;

FIG. 4 shows an example of a table registering toner consumption amount information managed and maintained by a document processing apparatus or part, such as document processing apparatus 100 depicted in FIG. 1A;

FIG. 5 shows an example of a table registering output time amount information managed and maintained by a document processing apparatus or part, such as document processing apparatus 100 depicted in FIG. 1A;

FIGS. 6A through 6D illustrate examples of messages displayed by a document processing apparatus or part, such as document processing apparatus 100 depicted in FIG. 1A;

FIG. 12 illustrates an example of a user interface screen caused by a document processing apparatus or part, such as document processing apparatus 100 depicted in FIG. 1A, to be displayed;

FIG. 15 shows an example of a table registering usage history information managed and maintained by a document processing apparatus or part, such as document processing apparatus 100 depicted in FIG. 1A;

FIGS. 16A-16D illustrate examples of messages displayed by a document processing apparatus or part, such as document processing apparatus 100 depicted in FIG. 1A;

FIG. 20 illustrates an example of a user interface screen caused by a document processing apparatus, such as document processing apparatus 100 depicted in FIG. 1A, to be displayed; and FIG. 21 shows an example of a table registering power consumption information managed and maintained by a document processing apparatus or part, such as document processing apparatus 100 depicted in FIG. 1A;

FIG. 22 illustrates an example of a user interface screen caused by a document processing apparatus, such as document processing apparatus 100 depicted in FIG. 1A, to be displayed;

FIG. 24 illustrates an example of a user interface screen caused by a document processing apparatus, such as document processing apparatus 100 depicted in FIG. 1A, to be displayed.

DETAILED DESCRIPTION

Figure 1A:
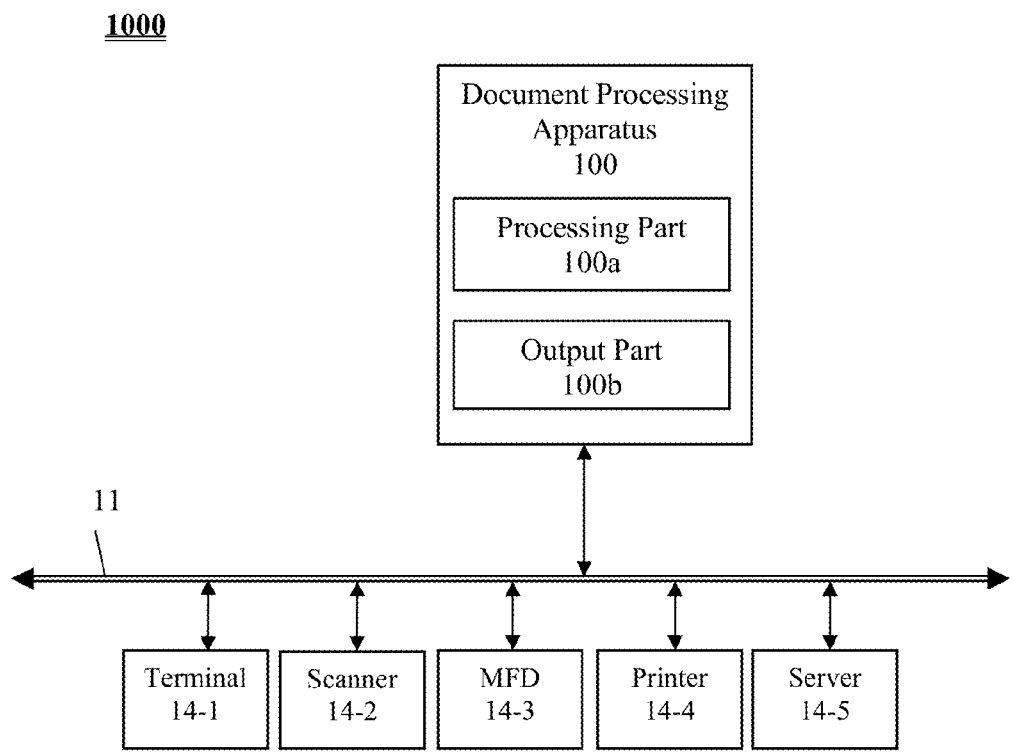
FIGS. 1A-1F show block diagrams of respective systems, in accordance with various exemplary embodiments.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for monitoring energy, paper and/or toner consumption of an information technology device, and for encouraging a user to reduce the consumption of energy, paper or toner when using the information technology device.

For example, FIG. 1A shows schematically a document processing system 1000 for reducing consumption of paper and other resources in connection with printing, copying, etc., according to an exemplary embodiment. System 1000 includes a document processing apparatus 100 that includes a processing part 100a and an output part 100b. System 1000 also includes a plurality of network devices (i.e. network-connected devices) 14-1 through 14-5, all interconnected by a network 11. The plurality of network devices 14-1 through 14-5 includes, for example, a terminal 14-1, scanner 14-2, MFD 14-3, printer 14-4 and network server 14-5. While the examples of this disclosure will simply refer to network devices 14-1 through 14-5 in the interests of brevity, the aspects of this disclosure are applicable to a network having an arbitrary number of devices. The apparatus 100 itself may be any stand-alone or network-connected device including but not limited to a personal, notebook or workstation computer, a terminal, a kiosk, a PDA (personal digital assistant), a tablet computing device, a smartphone, a scanner, a printer, a plotter, a facsimile machine, a multi-function device (MFD), a server, a mobile phone or handset, another information terminal, etc. The apparatus 100 may be configured with software allowing the device to communicate through network 11 with other devices, such as devices 14-1 through 14-5.

The processing part 100a (also referred to in this disclosure as a 'job processing part' or 'document processing part') is configured to receive an instruction to perform an output job such as a print job, copy job, etc., as well as receive specific job settings corresponding to the output job. The specific job settings for the output job may include, for example, selection of a simplex setting (print only on one side of paper sheets), a duplex setting (print on both sides of paper sheets), or combined print settings (multiple pages on each side of a paper sheet).

The instruction to perform the output job and specific job settings may be received, for example, from an IT device (such as terminal 14-1) connected to the apparatus 100 via network 11. For instance, when the user of the terminal 14-1 wishes to perform a print job, the user may submit a print job command to a software application operating on the terminal 14-1, wherein the application transmits a print job instruction to the document processing apparatus 100 via network 11. The terminal 14-1 transmitting the input document and/or print instruction may include any stand-alone or network-connected device including but not limited to a personal, notebook or workstation computer, a terminal, a kiosk, a PDA (personal digital assistant), a tablet computing device, a smartphone, a scanner, a printer, a plotter, a facsimile machine, a multi-function device (MFD), a server, a mobile phone or handset, another information terminal, etc.

Figure 2:
FIG. 2 illustrates an example of a user interface screen caused by a document processing apparatus or part, such as document processing apparatus 100 depicted in FIG. 1A, to be displayed.

Alternatively, the output job instruction may also be received directly from a user of the document processing apparatus 100 via input controls of the document processing apparatus 100 itself. For example, the user interface part 100b of the document processing apparatus may include a touchscreen configured to receive user instructions for performing an output job, as well as user selection of job settings corresponding to the output job. FIG. 2 illustrates an example of such a user interface screen displayed by the user interface part 100b of the apparatus 100 on a display screen of the apparatus 100. The user interface screen allows a user to select a print job (e.g. "Presentation4.ppt") for printing, as well as select various job settings for the print job, such as simplex mode, duplex mode, and combine pages mode (more than one page per sheet). The information depicted in FIG. 2 is merely exemplary, and other may be included in a user interface screen displayed by the user interface part 100b.

As another example, the underlying document that is the subject of the output job may be generated by scanning a paper or physical hardcopy of a document using a scanning device, and then using Optical Character Recognition (OCR) technology to parse the scanned image, detect text and other data in the scanned image, and generate a digital input document including text that corresponds to the hardcopy of the scanned input document. The aforementioned scanning device may be a component of the document processing apparatus 100 itself. Alternatively, the scanning device may be included in the scanner 14-2 or the MFD 14-3, for example, wherein the input document is transmitted to the document processing apparatus 100 via the network 11. Additional aspects or scanning and OCR are conventional (unless otherwise discussed herein), and in the interest of clarity and brevity are not discussed in detail herein.

Figure 1B:
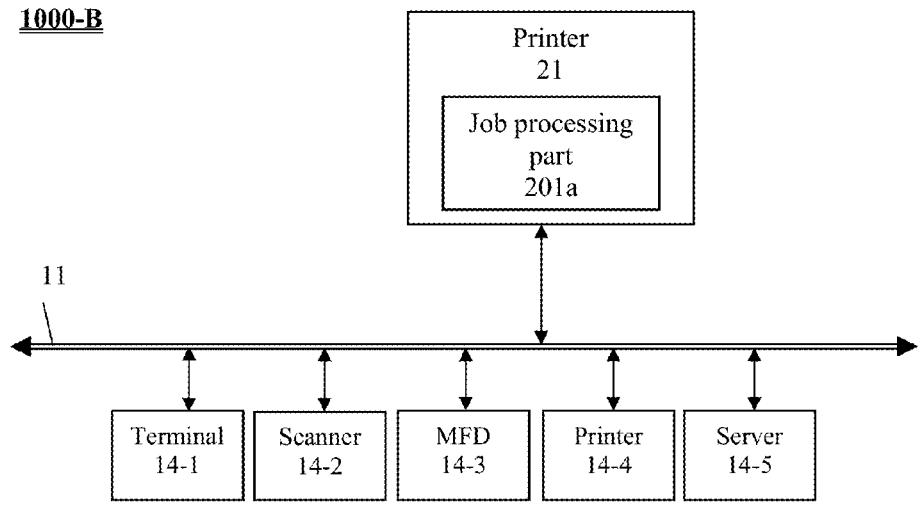

While the example shown in FIG. 1A depicts the document processing apparatus 17 and processing part 100a as being external to the network devices 14-1 through 14-5, one or more components of the document processing apparatus 100, such as the processing part 100a, may instead or in addition be a component of a network device. For example, FIG. 1B depicts an example of a system 1000-B according to another exemplary embodiment, wherein job processing part 201a is included as a part of a printer 21 connected to the network 11. The job processing part 201a may be substantially similar to the processing part 100a described above with reference to FIG. 1A. The job processing part 201a may include a printer driver or print application for the printer 21.

Figure 1C:
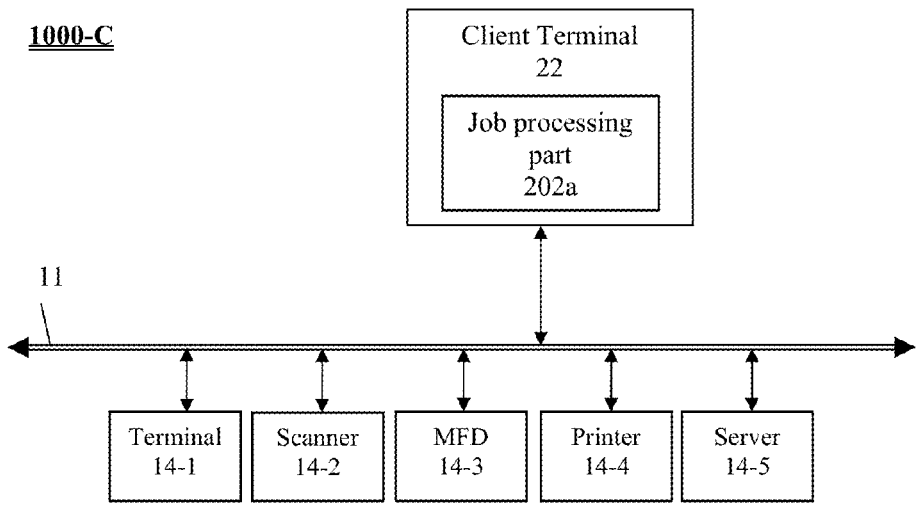
Figure 1D:
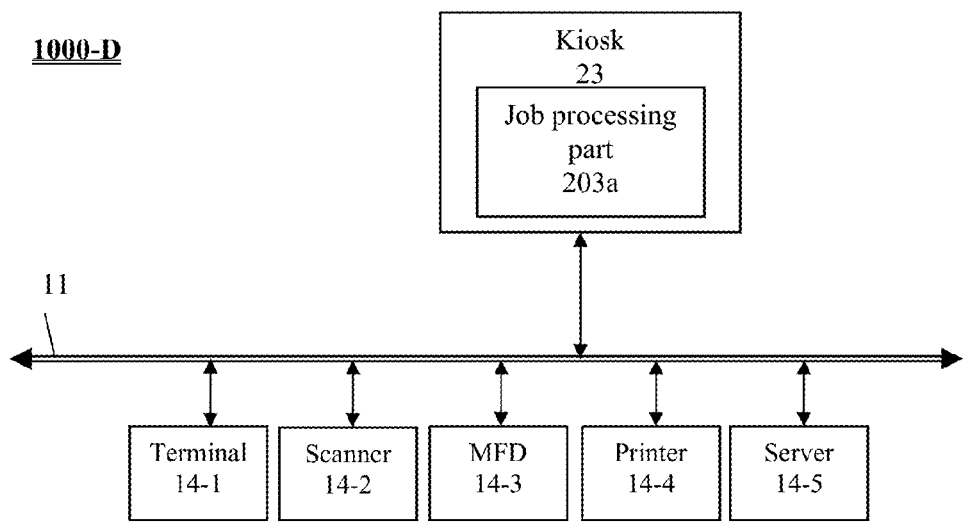
Figure 1E:
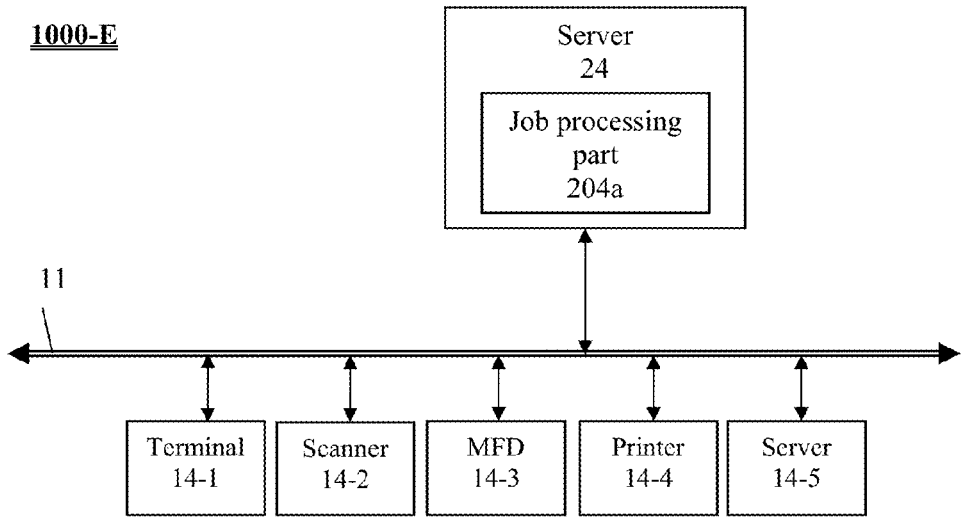
Figure 1F:
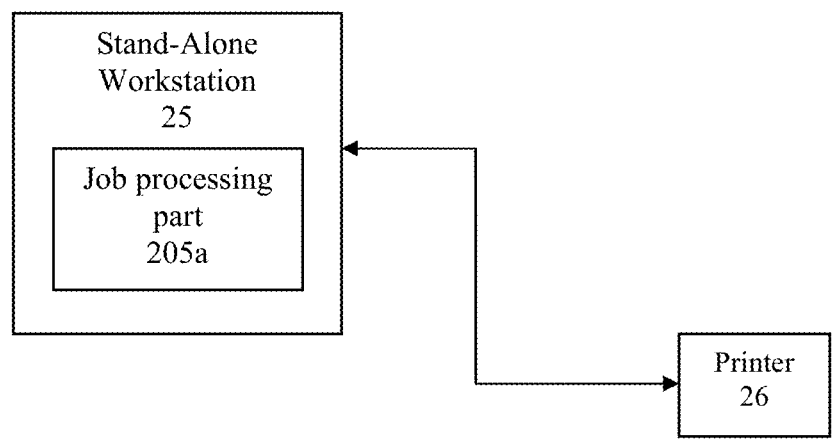

As another example, FIG. 1C depicts an example of a system 1000-C, wherein the job processing part 202a is included as a part of a client terminal 22 connected to the network 11. The job processing part 202a may be substantially similar to the processing part 100a described above with reference to FIG. 1A. The job processing part 202a may include a printer driver or print application for the client terminal 22. Similarly, FIG. 1D depicts an example of a system 1000-D, wherein the job processing part 203a is included as a part of a kiosk 23 connected to the network 11. The kiosk may include, for example, a display screen, a keyboard or touchscreen, a printer, etc. The job processing part 203a may be substantially similar to the processing part 100a described above with reference to FIG. 1A. The document processing part 203a may include a printer driver or print application for the kiosk 23. Likewise, FIG. 1E depicts an example of a system 1000-E, wherein the job processing part 204a is included as a part of a print server, mail server or other network server 24 connected to the network 11. The job processing part 204a may be substantially similar to the processing part 100a described above with reference to FIG. 1A. The server 24 may, for example, manage printing operations for devices connected to the network 11. As another example, FIG. 1F depicts an example of a system 1000-F, wherein the job processing part 205a is included as a part of a stand-alone workstation or terminal 25 connected directly to a printer 26. The job processing part 205a may be substantially similar to the processing part 100a described above with reference to FIG. 1A. The job processing part 205a may function as a printer driver or print application for the workstation 25.

Referring back to FIG. 1A, the user interface part 100b may include hardware and/or software configured to display a graphical user interfaces (GUI) and/or an object-oriented user interface on a display part (such as a monitor, display screen, touchscreen, etc.) of the apparatus 100, network-connected client terminal or external device. The user interface part 100b accepts inputs via a network or via an input part (such as a keyboard, mouse, touchscreen, etc.) of the apparatus 100, network-connected client terminal or external device. As another example, the user interface part 100b may include a Web-based user interface or web user interface (WUI) that generates web pages which are transmitted via a network (e.g. the Internet) and viewed by the user using a web browser program on an external device or a client terminal connected to the apparatus 100 via a network. The user interface part 100b may be implemented utilizing software programs and/or languages such as Java, AJAX, Adobe Flex, Microsoft .NET, or similar technologies.

The processing part 100a of the apparatus 100 is further configured to determine one or more total amounts of resources to be consumed, in a case that the output job is performed based on the specific job settings that were received with the instructions to perform the output job. Examples of the total amounts of resources consumed include a total amount of paper resources consumed (hereinafter a 'paper consumption amount'), a total amount of toner resources consumed (hereinafter a 'toner consumption amount'), and total output time required to perform the output job (hereinafter an 'output time amount').

The paper consumption amount refers to the total number of sheets of paper required to perform the output job. The processing part 100a may calculate the paper consumption amount corresponding to the output job by using any procedure that involves determining the number of pages in the output job, and also taking into account whether the job settings indicate simplex mode (only printing one side or a sheet of paper), duplex mode (printing on both sides of a sheet or paper), and/or combine pages mode (more than one page on each side of a paper sheet). For example, if the job settings indicate simplex mode (printing on only one side of sheets of paper) and no combined printing is used (i.e. only one page of the job on a single side of a paper sheet), then the paper consumption amount calculated by the processing part will simply equal the number of total pages of the output job.

As another example, if simplex mode and combined printing is utilized with 2 pages printed on one side of a sheet of paper, then a print job having 2×b pages will require b sheets of paper, and a print job having [(2×b)+1] pages will require b+1 sheets of paper. For instance, a print job having 14 pages=2×7 pages will require 7 sheets of paper, and a print job having 15 pages=(2×7)+1 pages will require 7+1 or 8 sheets of paper. Further, if combined printing is utilized with 4 pages printed on one side of a sheet of paper, then a print job having 4×b pages will require b sheets of paper, and a print job having [(4×b)+y] pages, where y=1.3, will require b+1 sheets of paper. Similarly, if combined printing is utilized with 6 pages printed on one side of a sheet of paper, then a print job having 6×b pages will require b sheets of paper, and a print job having [(6×b)+y] pages, where y=1.5, will require b+1 sheets of paper.

As another example, if duplex mode is specified and no combined printing is utilized, then a print job having 2×b pages will require b sheets of paper, and a print job having [(2×b)+1] pages will require b+1 sheets of paper. For instance, a print job having 14 pages=2×7 pages will require 7 sheets of paper, and a print job having 15 pages=(2×7)+1 pages will require 7+1 or 8 sheets of paper.

The above described procedures for calculating a page consumption amount are merely exemplary, and other procedures for calculating the number of sheets of paper required to perform an output job, based on specified output job settings (e.g. simplex, duplex, combined printing), may be utilized by those skilled in the art.

The processing part 100 may calculate the page consumption amount as the output job instruction and job settings are received by the apparatus 100. Alternatively, the processing part 100 may pre-calculate a variety of possible page consumption amount values in advance, based on a range of possible job settings (e.g. a range of possible no. of pages, simplex mode, duplex mode, combined print mode settings) and store them in a look-up table, such as illustrated in FIG. 3.

The processing part 100a may calculate a toner consumption amount using any of a variety of procedures for estimating the amount of toner required to perform a print job. For example, the processing part 100a may store a table such as the one illustrated in FIG. 4 that indicates the amount of toner required to perform each possible print job for each entry of the table that corresponds to different possible job settings. The information of such a table may be provided in by a device manufacturer, for example, or may be generated based on usage/history information obtained by the information processing apparatus 100.

Alternatively, the processing part 100a may store a one-page toner value indicating the average amount of toner required to print one side of one sheet of paper of information, and multiply this by the number of sides of sheets of paper to be output. For example, if the output job is to be performed in simplex mode (with or without combined printing), then processing part may simply multiply the one-page monochrome toner value by the page consumption amount that was calculated above.

The processing part 100a may calculate an output time amount (i.e. the amount of time required to perform a job) by using any of a variety of procedures for estimating the amount of time required to perform a print job, copy job or other type of output job. For example, the processing part 100a may store a table such as the one illustrated in FIG. 5 that indicates the amount of time required to perform each possible print job for each entry of the table that corresponds to different possible job settings. The information of such a table may be provided by a device manufacturer, for example, or may be generated based on usage/history information obtained by the information processing apparatus 100.

Alternatively, the processing part 100a may store a one-page output time value indicating the average amount of time required to print one side of one sheet of paper of information, and multiply this by the number of sides of sheets of paper to be output. For example, if the output job is to be performed in simplex mode (with or without combined printing), then processing part may simply multiply the one-page output time value by the page amount that was calculated above.

The above described procedures for calculating a toner consumption amount and output time amount are merely exemplary, and other procedures for calculating the amount of toner required to perform a job or the time required to perform a job, based on specified output job settings (e.g. no of pages, simplex mode, duplex mode, combined printing mode), may be utilized by those skilled in the art.

After determining one or more total amounts of resources to be consumed (e.g. paper consumption amount, toner consumption amount, and output time amount) in a case that the output job is performed based on the specific job settings, the processing part 100a calculates one or more total amounts of savings in resources to be consumed in a case that the output job is instead performed based on alternative job settings, as compared to the aforementioned total amounts of resources to be consumed in the case that the output job is performed based on the specific job settings. The total amounts of savings may be a total amount of savings in paper (hereinafter a 'paper savings amount'), a total amount of savings in toner (hereinafter a 'toner savings amount'), and a total amount of savings in output time (hereinafter an 'output time savings amount'), which are all calculated based on alternative job settings that differ in some manner from the output job settings originally received by the apparatus 100.

The manner in which the processing part 100a calculates a paper savings amount is described below. The processing part may calculate an alternative paper consumption amount based on the alternative job settings, using the same procedures described earlier. Thereafter, the processing part may calculate the paper savings amount to be the difference between the alternative paper consumption amount (calculated based on the alternative job settings) and the actual paper consumption amount (calculated based on the received job settings).

For example, if the output job has 10 pages, and the received job settings indicate simplex mode and no combined page mode, then with reference to the information of FIG. 3, the processing part will determine that the actual paper consumption amount will be 10 sheets of paper, using the procedures described above. If the alternative job setting is simplex mode with combined printing (4 pages per sheet) then the processing part may refer to the information of FIG. 3 and determine that the alternative paper consumption amount will be only 3 sheets of paper, using the procedures described above. Thus, the processing part will calculate the paper savings amount as the difference between the actual paper consumption amount and the alternative paper consumption amount, i.e. 10 sheets of paper—3 sheets of paper, which equals 7 sheets of paper. As another example, if the alternative job setting is duplex mode without combined pages, then the processing part may refer to the information of FIG. 3 and determine that the alternative paper consumption amount will be 5 sheets of paper, using the procedures described above. Thus, the processing part will calculate the paper savings amount as the difference between the actual paper consumption amount and the alternative paper consumption amount, i.e. 10 sheets of paper—5 sheets of paper, which equals 5 sheets of paper.

In a similar manner, the processing part may calculate a toner savings amount by determining an alternative toner consumption amount based on the alternative job settings, and calculating the difference between the alternative toner consumption amount (calculated based on the alternative job settings) and the actual toner consumption amount (calculated based on the received job settings). The processing part may use the information stored in the table of FIG. 4, for example, in order to perform these calculations.

Similarly, the processing part may calculate an output time savings amount by determining an alternative output time amount based on the alternative job settings, and calculating the difference between the alternative output time amount (calculated based on the alternative job settings) and the actual output time amount (calculated based on the received job settings). The processing part may use the information stored in the table of FIG. 5, for example, in order to perform these calculations.

The user interface part 100*b* of the document processing apparatus 100 is configured to display an encouraging, motivational message on a display part of the document processing apparatus indicating the alternative job settings, and one or more of the total mounts of savings of resources in the case that the output job is performed based on the alternative job settings. That is, the motivational message may indicate the alternative job settings, and one or more of a paper savings amount, toner savings amount, and output time savings amount calculated by the processing part 100*a* as described above. The message may include pictures, aesthetic elements and other features in order to encourage and/or motivate a user to conserve paper, toner, energy etc. FIG. 6A through 6D depict examples of such motivational messages. The message illustrated in FIG. 6A includes a paper savings amount calculated by the processing part 100*a*, and the message illustrated in FIG. 6B includes an output time savings amount calculated by the processing part 100*a*.

Further, instead of displaying the paper savings amount (or toner savings amount or output time savings amount) itself, the processing part may instead calculate a percentage (e.g. 50%) or fraction (e.g. ¾) representing some relationship between the alternative paper consumption amount and the actual paper consumption amount, and display this percentage or fraction in the motivational message, as illustrated in FIG. 6C for example. Further, the processing part may display the alternative paper consumption amount (or alternative toner consumption amount or alternative output time amount) instead or in addition to the actual paper consumption amount or paper savings amount, as illustrated in FIG. 6D for example.

Thus, according to this exemplary embodiment, a document processing apparatus outputs a motivational and encouraging message to a user of the apparatus, indicating how much paper, toner, time, other resources, etc. a user performing an output job (such as a print job or copy job) could save, if the user changed the job settings of the output job in a particular way. Thus, the user becomes aware of their consumption levels and the need for conservation, and the user is provided with practical options for saving energy and resources.

While the example shown in FIG. 1A includes one document processing apparatus and five other network devices 15-1 through 15-4, it should be appreciated that such numbers of devices, terminals and apparatuses are arbitrary and are selected as an example in order to facilitate discussion, and that the subject matter of this disclosure can be implemented in a system including one or more systems, servers, apparatuses and terminals. Other devices, such as other scanners, printers and multi-function devices may also be connected to a network, as is well known in the art. Further, the error reporting management apparatus and network devices may be connected in a different network arrangement to that depicted in FIG. 1A.

The network 11 can include one or more of a secure intranet or extranet local area network, a wide area network (WAN), any type of network that allows secure access, etc., or a combination thereof. Further, other secure communications links (such as a virtual private network, a wireless link, etc.) may be used as well as the network connections. In addition, the document processing apparatus may be connected to a network that employs TCP/IP (Transmission Control Protocol/Internet Protocol), but other protocols such as SNMP (Simple Network Management Protocol) and HTTP (Hypertext Transfer Protocol) can also be used. How devices can connect to and communicate over the networks is well-known in the art and is discussed for example, in "How Networks Work", by Frank J Derfler, Jr. and Les Freed (Que Corporation 2000) and "How Computers Work", by Ron White, (Que Corporation 1999), the entire contents of each of which are incorporated herein by reference.

The document processing apparatus of this disclosure may be realized by a computer program product including a computer-usable, non-transient medium (such as a disk storage apparatus) having instructions tangibly embodied therein that are executed by a computer. Thus, it should be understood that the document processing apparatus may be executed on a computer. The document processing apparatus may be executed on a client terminal and/or network-connected device. The functionalities of the processing part 100*a* may be provided by a software application such as a printer driver, print application, another application, an operating system (OS), firmware, etc.

The document processing apparatus may include a data store that can comprise one or more structural or functional parts that have or support a storage function. For example, the data store can be, or can be a component of, a source of electronic data, such as a document access apparatus, a back-end server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

Document processing apparatus 100 is not limited to a computer or server, but can be manifested in any of various devices that can be configured to communicate over a network and/or the Internet, including but not limited to a personal, notebook or workstation computer, a terminal, a kiosk, a PDA (personal digital assistant), a tablet computing device, a smartphone, a scanner, a printer, a facsimile machine, a multi-function device (MFD), a server, a mobile phone or handset, another information terminal, etc. Each device may be configured with software allowing the device to communicate through networks with other devices. It should be understood that the document processing apparatus 100 may be the device that is actually performing the output job (e.g. copy job, scanning job, etc.), or the document processing apparatus may be connected via the network 11 to another device (such as MFD 14-3 or printer 14-4) that is performing the output job. Similarly, it should be understood that one or more of the processing functions described above as being performed by the processing part 100a may instead be performed by another device connected to the document processing apparatus 100 via the network 11, such as terminal 14-1, MFD 14-3 or server 14-5.

Figure 7:
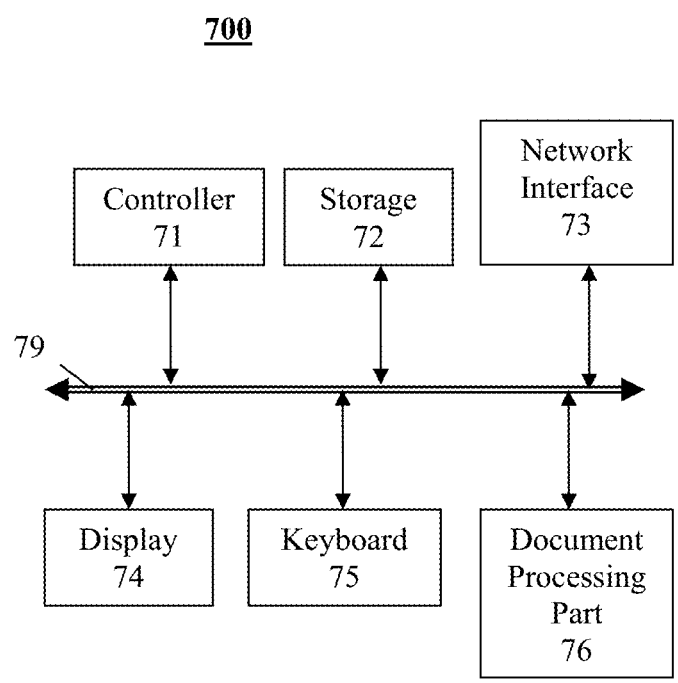
FIG. 7 shows a block diagram of an exemplary configuration of a computer that can be used to implement a document processing apparatus, such as document processing apparatus 100 illustrated in FIG. 1A.

FIG. 7 shows an exemplary constitution of a document processing apparatus as a computer, for example, that can be configured through software to provide the document processing apparatus 100 illustrated in FIG. 1A. As shown in FIG. 7, the document processing apparatus 700 includes a controller (or central processing unit) 71 that communicates with a number of other components, including memory or storage part 72, network interface 73, display 74, keyboard 75 and document processing part 76, by way of a system bus 79.

The document processing apparatus 700 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In document processing apparatus 700, the controller 71 executes program code instructions that controls device operations. The controller 71, memory/storage 72, network interface 73, display 74 and keyboard 75 are conventional, and therefore in order to avoid occluding the inventive aspects of this disclosure, such conventional aspects will not be discussed in detail herein. The document processing part 76 may include the functionality of the processing part 100a of the document processing apparatus 100, as described above with reference to FIG. 1A. Alternatively, the functionality of the processing part 100a may be provided by the controller 71, for example.

The document processing apparatus 700 includes the network interface 73 for communications with other devices through a network. However, it should be appreciated that the subject matter of this disclosure is not limited to such configuration. For example, the document processing apparatus 700 may communicate with client terminals through direct connections and/or through a network to which some components are not connected. As another example, the document processing apparatus 700 need not be provided by a server that services terminals, but rather may communicate with the devices on a peer basis, or in another fashion.

In one embodiment, document processing apparatus 100 may be manifested as a multi-function device, which may be any apparatus (including a microprocessor chip or a collection of devices having varying degrees of integration) that has the ability to perform two or more functionalities. The multi-function device may be a terminal or any computing device including but not limited to a personal, notebook or workstation computer, a kiosk, a PDA (personal digital assistant), a tablet computing device, a smartphone, a scanner, a printer, a facsimile machine, a server, a mobile phone or handset, another information terminal, etc.

Figure 8:
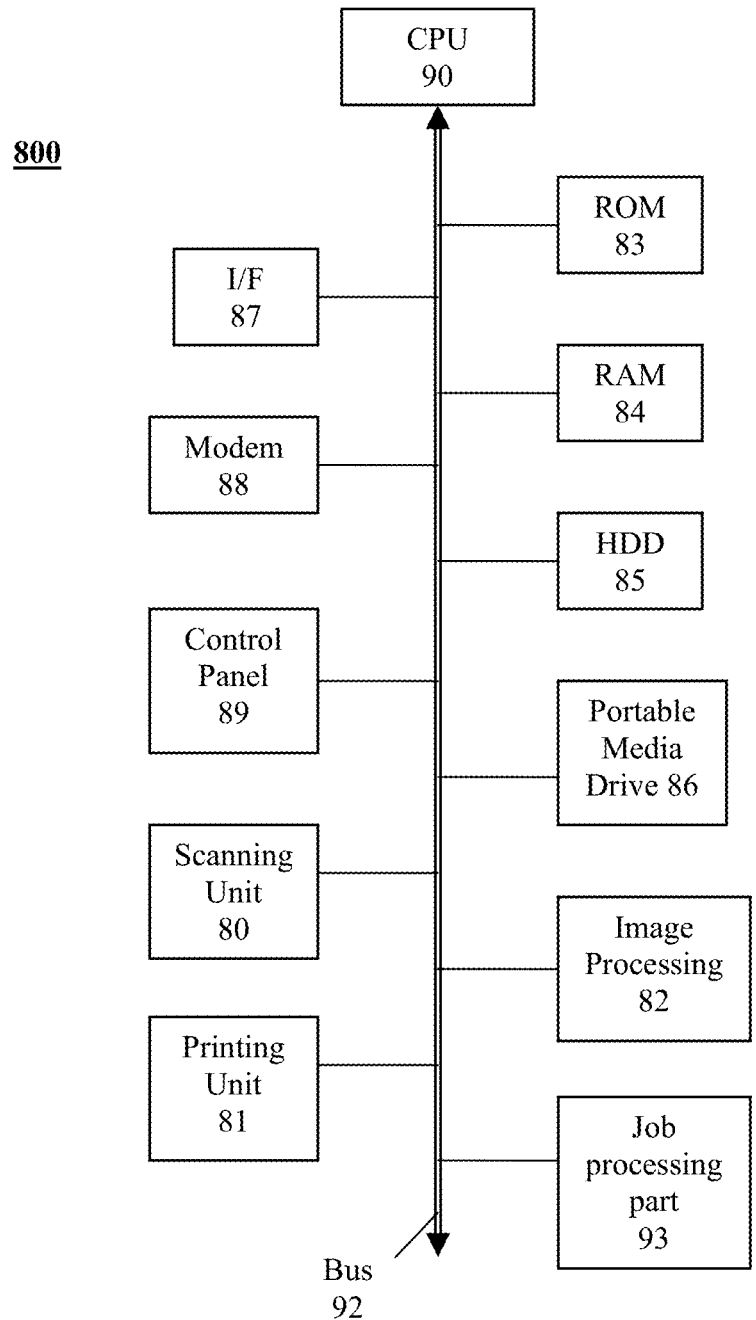
FIG. 8 shows a block diagram of an exemplary configuration of a multi-function device that can be used to implement a document processing apparatus, such as document processing apparatus 100 illustrated in FIG. 1A.

An example of a configuration of a multi-function device is shown schematically in FIG. 8. Device 800 includes a central processing unit (CPU) 90, and various elements connected to the CPU 90 by an internal bus 92. The CPU 90 services multiple tasks while monitoring the state of the device 800. The elements connected to the CPU 90 include a scanning unit 80, a printing unit 81, an image processing unit 82, a read only memory (for example, ROM, PROM, EPROM, EEPROM, etc.) 83, a random access memory (RAM) 84, a hard disk drive (HDD) 85, portable media (for example, floppy disk, optical disc, magnetic discs, magneto-optical discs, semiconductor memory cards, etc.) drives 86, a communication interface (I/F) 87, a modem unit 88, an operation panel 89, and a job processing part 93.

Program code instructions for the device 800 can be stored on the read only memory 83, on the HDD 85, or on portable media and read by the portable media drive 86, transferred to the RAM 84 and executed by the CPU 90 to carry out the instructions. These instructions can include the instructions to the device to perform specified ones of its functions and permit the device 800 to interact with other network devices, and to control the operation panel 89 and the image processing unit 82 of the device 800. The job processing part 93 may include the functionality of the processing part 100a of the document processing apparatus 100, as described above with reference to FIG. 1A. Alternatively, the functionality of the processing part 100a may be provided by the CPU 90, for example.

The operation panel 89 includes a display screen that displays information allowing the user of the device 800 to operate the device 800. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the device, so as to allow the operator to conveniently take advantage of the services provided by the system. The display screen does not need to be integral with, or embedded in, the operation panel 89, but may simply be coupled to the operation panel by either a wire or a wireless connection. The operation panel 89 may include keys for inputting information or requesting various operations. Alternatively, the operation panel 89 and the display screen may be operated by a keyboard, a mouse, a remote control, touching the display screen, voice recognition, or eye-movement tracking, or a combination thereof. The device 800 is a multifunction device (with scanner, printer and image processing) and in addition can be utilized as a terminal to download documents from a network.

Additional aspects or components of the device 800 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J Derfler, Jr. and Les Freed (Que Corporation 2000), the entire contents of each of which are incorporated herein by reference.

Figure 9:
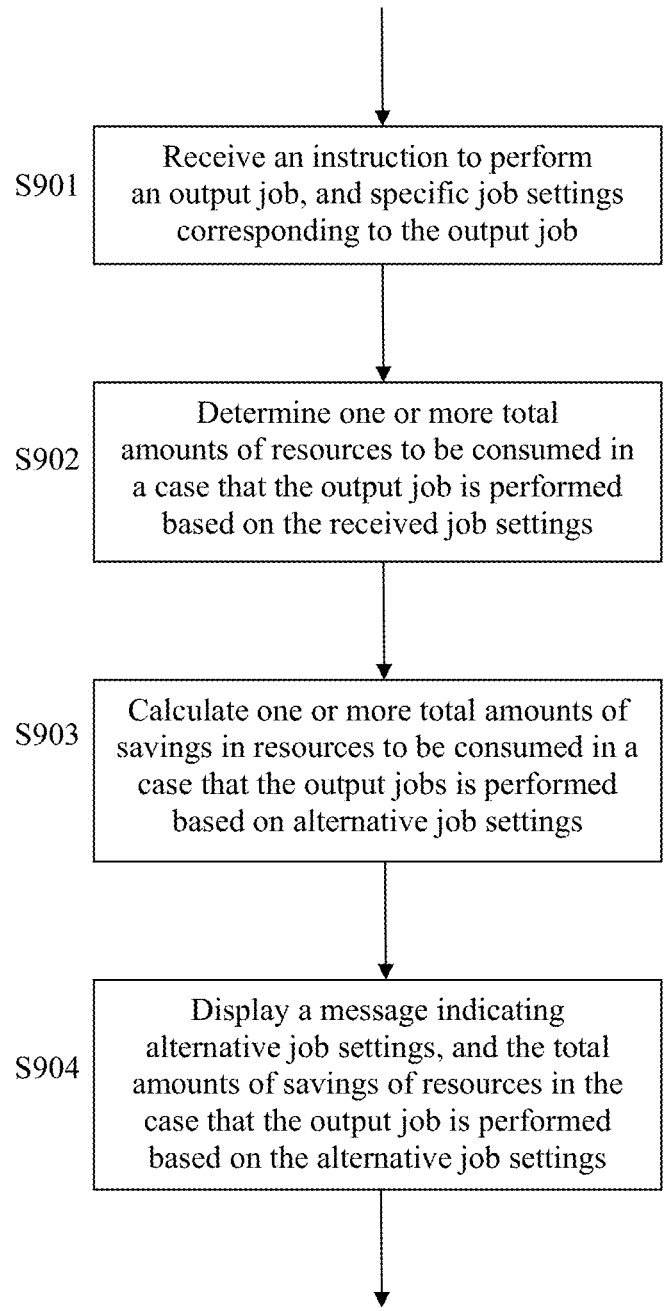
FIG. 9 shows a flowchart of a method performed by a document processing apparatus or part, such as document processing apparatus 100 illustrated in FIG. 1A, according to an exemplary embodiment.

Turning now to FIG. 9, there is shown a flowchart of a method performed by a document processing apparatus, such as document processing apparatus 100 illustrated in FIG. 1A, according to an exemplary embodiment.

In S901, the document processing apparatus receives (i) an instruction to perform an output job and (ii) specific job settings corresponding to the output job. For example, the apparatus may receive the output job instruction and specific job settings via a user interface screen of the apparatus, as illustrated in FIG. 2. Alternatively, the apparatus may receive the output job instruction and specific job settings from a terminal or network device connected to the document processing apparatus via a network. In S902, the document processing apparatus determines one or more total amounts of resources to be consumed (e.g. paper consumption amount, toner consumption amount, and output time amount) in a case that the output job is performed based on the specific job settings received in S901. The document processing apparatus may refer to tables registering paper consumption amount information, toner consumption amount information and output time amount information (such as those illustrated in FIG. 3, FIG. 4, and FIG. 5, respectively), in order to make these determinations.

In S903, the document processing apparatus calculates one or more total amounts of savings in resources to be consumed (e.g. paper savings amount, toner savings amount, output time savings amount) in a case that the output job is performed based on alternative job settings. Again, the document processing apparatus may refer to tables registering paper consumption amount information, toner consumption amount information and output time amount information (such as those illustrated in FIG. 3, FIG. 4, and FIG. 5, respectively), to aid in making these determinations. Finally, in S904, the document processing apparatus displays a message on a display part indicating the alternative job settings and the total amount of savings of resources (e.g. paper savings amount, toner savings amount, and output time savings amount) in a case that the output job is performed based on the alternative job settings. Examples of such messages are illustrated at, for example, FIG. 6A and FIG. 6B.

According to the aforementioned embodiments, the document processing apparatus calculates a paper consumption amount, toner consumption amount, or output time amount associated with said output job, based on job settings, and calculates at least one of a paper savings amount, toner savings amount, output time savings amount, based on alternative job settings. However, the aspects of this embodiment could be applied to other resources in addition to paper, toner and time.

For example, the aspects of this embodiment could be applied to calculate a copy cost amount and copy cost savings amount, in a case where a user/client of a document processing apparatus is charged for performing print jobs or copy jobs on the document processing apparatus. For instance, the apparatus may maintain and register copy cost information in a table similar to those depicted in FIGS. 3-5, wherein the table indicates the charge/cost associated with performing each particular output job (i.e. each entry of the table) based on particular job settings.

As another example, the aspects of this embodiment could be applied to calculate an electricity consumption amount and electricity consumption savings amount. For instance, the apparatus may maintain and register electricity consumption information in a table similar to those depicted in FIGS. 3-5, wherein the table indicates the electricity consumption associated with performing each particular output job (i.e. each entry of the table) based on particular job settings. Alternatively, the document processing apparatus may store a value of electricity consumed when one side of one sheet of paper is printed, and multiply this amount by the number of sides of paper sheets to be printed in the output job. Instead or in addition, the document processing apparatus may store a value of electricity consumed when the document processing apparatus is operated for specific time period (such as 1 second), and multiply this amount by the time required to perform the output job.

As another example, the aspects of this embodiment could be applied to calculate an electricity cost amount and electricity cost savings amount. For instance, the apparatus may maintain and register electricity cost information in a table similar to those depicted in FIGS. 3-5, wherein the table indicates the electricity cost associated with performing each particular output job (i.e. each entry of the table) based on particular job settings. Alternatively, the document processing apparatus may store a value of electricity cost incurred when one side of one sheet of paper is printed, and multiply this amount by the number of sides of paper sheets to be printed in the output job. Instead or in addition, the document processing apparatus may store a value of electricity cost incurred when the document processing apparatus is operated for specific time period (such as 1 second), and multiply this amount by the time required to perform the output job.

According to the exemplary embodiments of this disclosure, the document processing apparatus may determine what "alternative job settings" to use when calculating the alternative paper consumption amount (or alternative toner consumption amount, alternative output time amount, etc.) in order to determine the ultimate paper consumption savings amount (or toner savings amount, output time savings amount, etc.), based on any number of factors.

The processing apparatus may analyze all possible values of alternative job settings, in order to determine whether there are any alternative settings that would lead to savings of resources. That is, the alternative job settings should differ from the actual job settings, in the sense that they promote the consumption of paper, toner, electricity, time or other resources. For example, if the actual job settings specified by the user are duplex mode with combined page printing (6 pages on each side of a paper sheet), the alternative job settings should not be simplex mode with combine page printing (2 pages on each side of a paper sheet), since these alternative job settings would actually consume more resources, not less.

Other than this initial criteria, the alternative job settings may be randomly selected, or rotated through in a round-robin fashion, for example. As another example, the alternative job settings may be selected based on other properties of the output job. For instance, if the output job involves the printing of a word processing document, then the alternative job settings may be duplex mode, whereas if the output job involves the printing of slides or presentation handouts, the alternative job settings may be combined page printing mode (2, 4 or 6 pages on a side of a paper sheet). As another example, the alternative job settings may be selected based on the type of the output job or what keys are pressed on the user interface panel of the document processing apparatus. As simple non-limiting examples, when the output job is a copy job, simplex mode with combined page printing (2 pages per sheet) may be used as the alternative job settings, whereas when the output job is a print job, duplex mode with combined page printing (2 pages per sheet) may be used as the alternative job settings.

Further, the alternative job settings may be selected based on an identity of the user submitting the output job and the usage history log for that user. For example, if usage history information of the user indicates that the user has regularly used duplex mode printing in the past, then the document processing apparatus may determine that this user is more amenable to selecting duplex mode printing, and so in a case when the output job is in simplex mode, the alternative job settings may include duplex mode. Likewise, if usage history information of the user indicates that the user has regularly used combined page printing mode in the past for a certain type of document X, then the document processing apparatus may determine that this user is more amenable to selecting combined page printing mode for that type of document X, and so in a case when the output job is for the document type X in non-combined mode, the alternative job settings may include a type of combined page printing. The identity of the user may be determined based on user identification/authentication/password information provided by the user when the user is operating a control panel of the document processing apparatus 100, or which is received from the user's terminal via a network when the user requests the output job from that terminal. Alternatively, the user may have a ID card including an RFID tag on their person, and when the user approaches the document processing apparatus 100, an RFID reader/scanner of the apparatus 100 may access the information on the RFID tag of the user's ID card to determine the identity of the user.

According to this exemplary embodiment, the motivating message generated by the document processing apparatus 100 may be transmitted via network to a client terminal to be displayed on a display part of the client terminal, after the user of the client terminal requests the output job to be performed by the document processing apparatus 100. As another example, the motivating message may be displayed on a control panel of the document processing apparatus, when the user operates the control panel of the document processing apparatus to request a copy job. This is advantageous since in many cases an apparatus is in sleep mode when a user operates the control panel of the apparatus to request a copy job, and thus the apparatus requires several moments or minutes to exit sleep mode, warm up and prepare to execute the copy job. Thus, the message can be displayed during this period when the apparatus is exiting sleep mode or warming up. Similarly, many organizations use a 'locked-print' mode where a print job is transmitted to a document processing apparatus from a user terminal, but the user that requested the print job must physically operate the document processing apparatus (such as by entering a password or authentication information into the apparatus) before the apparatus will output the job. Thus, the motivating message may be displayed on a control panel of the document processing apparatus, when the user operates the control panel of the document processing apparatus to request output of the print job. Again, in many cases an apparatus is in sleep mode when a user operates the control panel of the apparatus to request output of a print job, and thus the apparatus requires several moments or minutes to exit sleep mode, warm up and prepare to output the print job. Therefore, the message can be displayed during this period when the apparatus is exiting sleep mode or warming up.

Figure 10A:
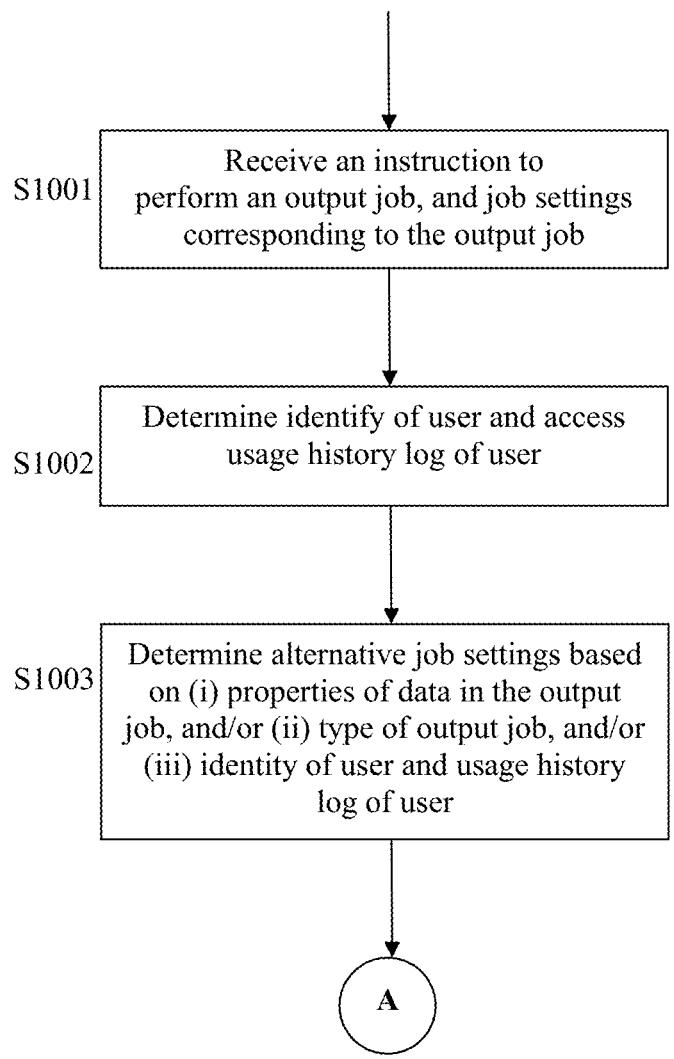
FIGS. 10A and 10B show a flowchart of a more detailed method performed by a document processing apparatus or part, such as document processing apparatus 100 illustrated in FIG. 1A, according to an exemplary embodiment.
Figure 10B:
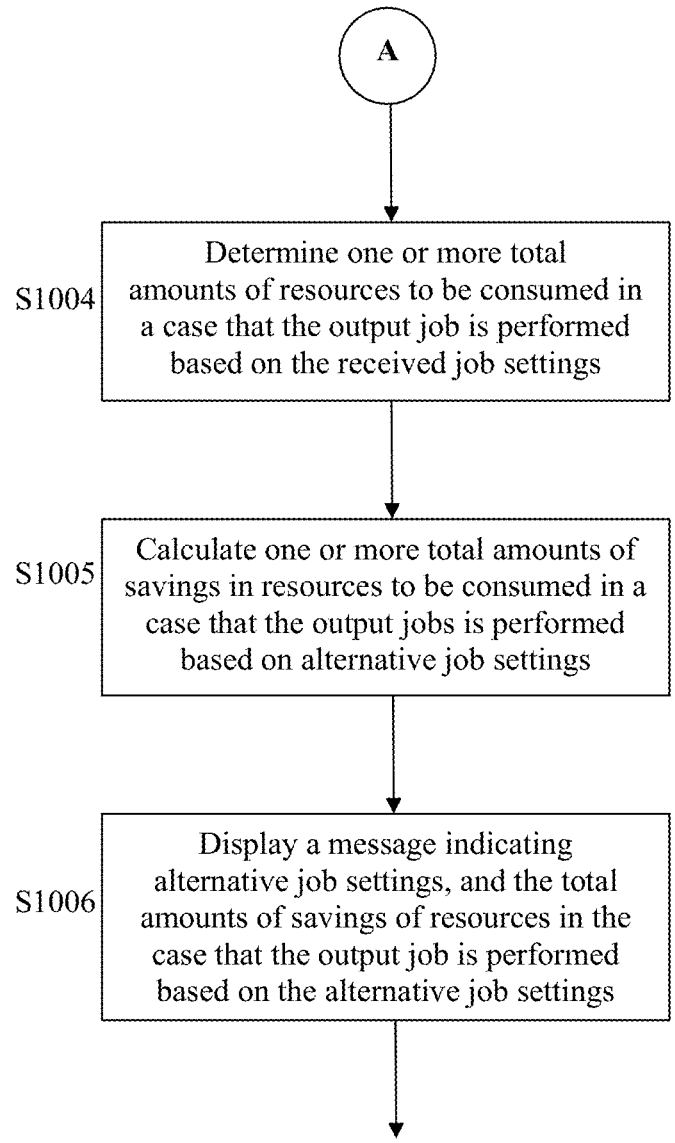

Turning now to FIGS. 10A and 10B, there is shown a flowchart of a more detailed method performed by a document processing apparatus, such as document processing apparatus 100 illustrated in FIG. 1A, according to an exemplary embodiment.

In S1001, the document processing apparatus receives (i) an instruction to perform an output job and (ii) job settings corresponding to the output job. For example, the apparatus may receive the output job instruction and associated job settings via a user interface screen of the apparatus, as illustrated in FIG. 2. Alternatively, the apparatus may receive the output job instruction and associated job settings from a terminal or network device connected to the document processing apparatus via a network. In S1002, the apparatus determines an identity of the user that submitted the output job, and accesses a usage history log of the user that submitted the output job. In S1003, the apparatus determines alternative job settings based on properties of data in the output job (e.g. is the subject of the output job a word processing document, a handout of presentation slides, etc.), and/or the type of output job (e.g. is the output job a copy job, print job, etc.) and/or an identity of user and usage history log of user (e.g. does the usage history log of the user indicate that the user is more amendable to certain types of job settings, such as duplex mode or combined page printing mode). Thereafter, S1004-S1006 are performed, where S1004-S1006 are substantially similar to S902-S904, respectively, illustrated in FIG. 9.

According to another aspect of this disclosure, the document processing apparatus 100 not only displays a motivation, encouraging message indicating paper savings amount (or toner savings amount, output time savings amount, etc.), but also provides the user with a procedure by which to easily change the original job settings of the output job to new job settings. The new job settings may be, for example, the alternative job settings that were used to calculate the paper savings amount, toner savings amount, output time savings amount, etc. Before actually applying the change requested by the user, a message or user interface screen is displayed comparing (a) the amounts of resources to be consumed in a case that the output job is performed based on the new job settings and (b) the amounts of resources to be consumed in a case that the output job is performed based on the current job settings.

Figure 11:
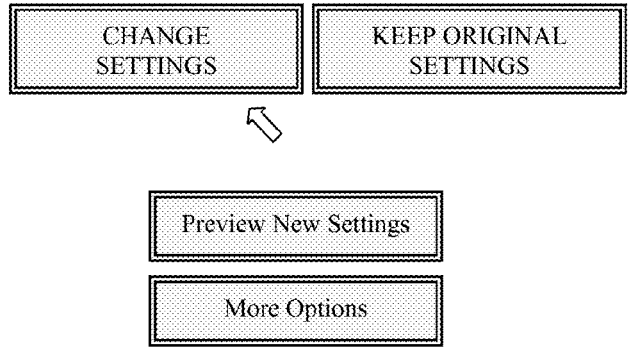
FIG. 11 illustrates an example of a user interface screen caused by a document processing apparatus or part, such as document processing apparatus 100 depicted in FIG. 1A, to be displayed.

The discussion that follows uses examples of saving paper resources in the interests of brevity, but it should be understood that these aspects may be applied similarly to saving toner, output time and other resources. After the user is presented with the simple motivational message, as illustrated in FIG. 6A for example, if the user clicks on the 'Learn More' button of the message, the user may be presented with the option of converting the current job settings to new job settings in order to perform the output job. For example, the user may be presented with a user interface screen such as that illustrated in FIG. 11, which indicates the original/current job settings and paper consumption amount. The user interface also indicates the alternative job settings, alternative paper consumption amount, paper savings amount, etc. (Although not shown in FIG. 11, the user interface screen may also display a percentage or fraction representing a relationship between the actual paper consumption amount and the alternative paper consumption amount, and so on). As seen in FIG. 11, the user is provided with the clear option of easily changing the original job settings to new job settings by clicking on the 'Change Settings' button, or keeping the original settings by clicking on the 'Keep Original Settings' button, in order to finally execute the output job.

Instead of displaying the user interface of FIG. 11, the document processing apparatus 100 may also display the user interface screen of FIG. 12. (Alternatively, the apparatus 100 may display the user interface screen of FIG. 12 after displaying the user interface screen of FIG. 11 and after the user clicks on the 'More Options' button of the user interface screen of FIG. 11). The user interface screen of FIG. 12 indicates the original/current job settings and paper consumption amount, and also allows the user to select the new job settings (e.g. the user can select simplex mode or duplex mode via a pull-down menu, and can select no combined page mode or combined page mode via another pull-down menu, as seen in FIG. 12). When the user selects a particular new job setting, the user interface screen also displays a new paper consumption amount e.g. "3 sheets of paper" (or new toner consumption amount, or new output time amount, etc.). Thus, the user can experiment with different options for output job settings, and immediately see an actual estimate for the amount or savings in paper, toner, time, cost, electricity etc. As seen in FIG. 12, the user is provided with the clear option of easily changing the original job settings to the new job settings selected by the user by clicking on the 'Change Settings' button, or keeping the original settings by clicking on the 'Keep Original Settings' button, in order to finally execute the output job.

Figure 13:
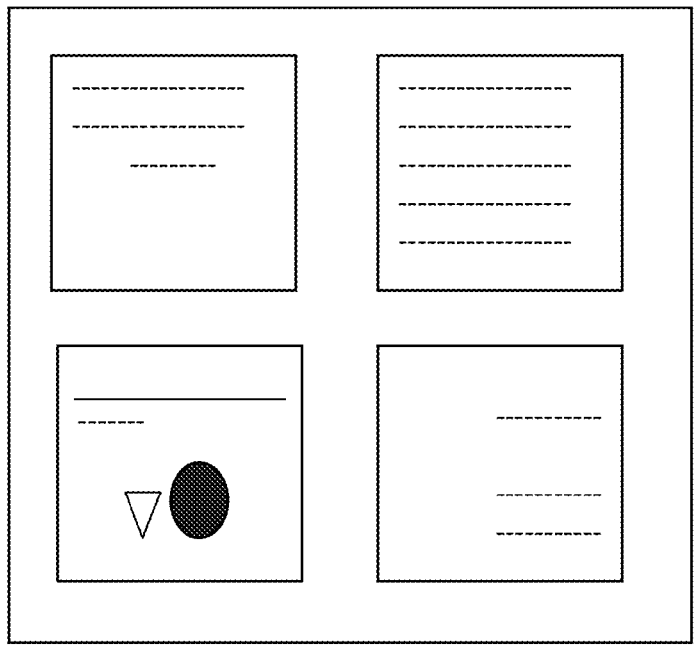
FIG. 13 illustrates an example of a user interface screen caused by a document processing apparatus or part, such as document processing apparatus 100 depicted in FIG. 1A, to be displayed.

If the user selects the 'Preview New Settings' button in the user interface screens illustrated in FIG. 11 and FIG. 12, the user interface part 100b of the apparatus 100 may display a preview of the result of the print job, copy job or other output job, based on the new job settings, as illustrated in FIG. 13. The user interface screen of FIG. 13 also includes other preview features (such as previewing the position of hole punches, bindings, stapling, margins, etc. . . . ), so that the user can visually understand what the final product of the output job will look like based on the new job settings.

Figure 14:
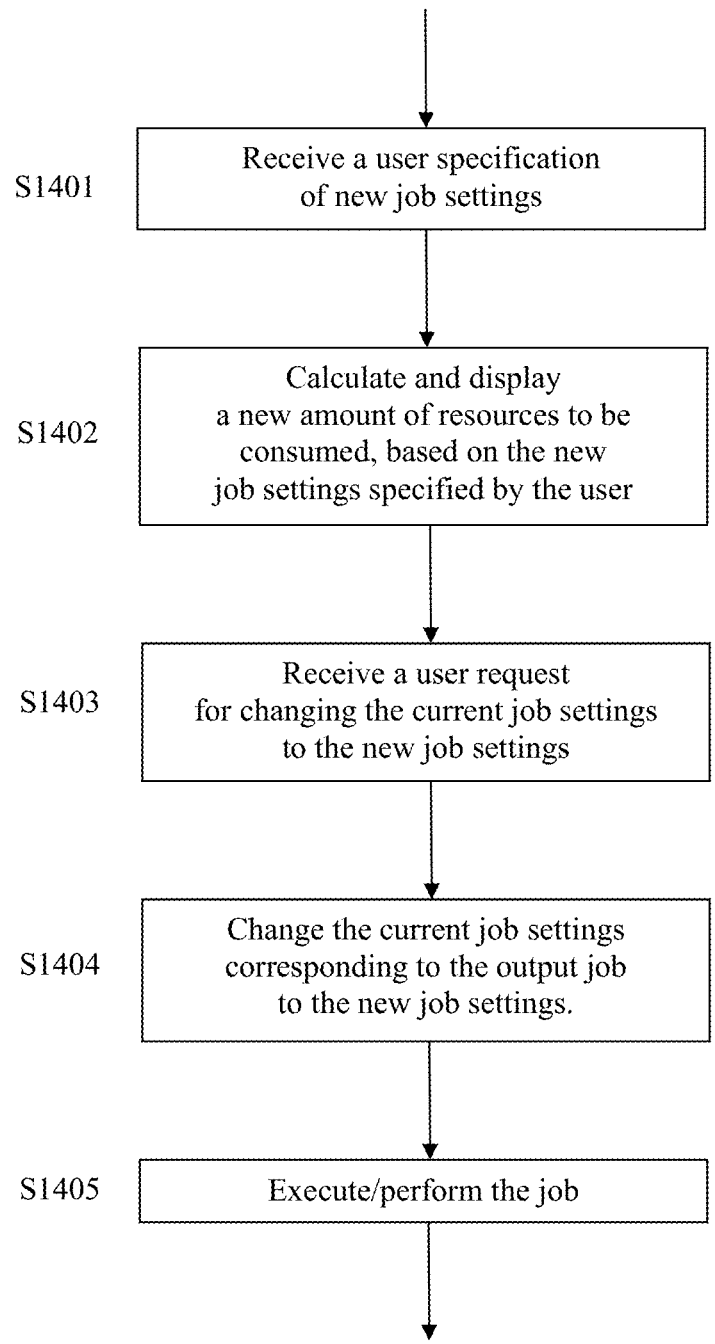
FIG. 14 shows a flowchart of a method performed by a document processing apparatus or part, such as document processing apparatus 100 illustrated in FIG. 1A, according to an exemplary embodiment.

Turning now to FIG. 14, there is shown a flowchart of a method performed by a document processing apparatus, such as document processing apparatus 100 illustrated in FIG. 1A, according to this exemplary embodiment.

In S1401, the document processing apparatus receives a user specification of new job settings. For example, the user may specify the new job settings via the pull-down menus in the user interface screen of FIG. 12. In S1402, the document processing apparatus calculates and displays a new amount of resources to be consumed (e.g. new paper consumption amount, new toner consumption amount, or new output time amount), based on the new job settings specified by the user. For example, the user interface screen of FIG. 12 indicates a new paper consumption amount (e.g. "3 sheets of paper"). In S1403, the document processing apparatus receives a user request for changing the job settings corresponding to the output job to the new job settings. For example, the user may select the 'Change Settings' button in the user interface screens of FIG. 11 or FIG. 12. Then in S1404, the document processing apparatus changes the job settings corresponding to the output job to the new job settings. Finally, in S1405 the document processing apparatus executes/performs the job, based on the new job settings.

According to another aspect of this disclosure, the document processing apparatus 100 may manage and maintain usage history information tracking in real-time the number of pages printed by a user. For example, FIG. 15 illustrates an example of a table registering usage history information managed and maintained by the information processing apparatus 100. The exemplary table of FIG. 15 indicates a plurality of users, and the amount of pages output by each user in a given month. The table also includes an average of the amount of pages printed in a given month by the users, as calculated by the processing part 100a. Since the document processing apparatus 100 tracks the number of pages printed by each user in real-time, the usage history information is not limited to sorting the usage history information by month (as illustrated in FIG. 15), but instead or in addition the usage history information can indicate the number of pages printed by each user over any particular time period (e.g. minute, hour, day, week, etc. . . . ).

Figure 16A:
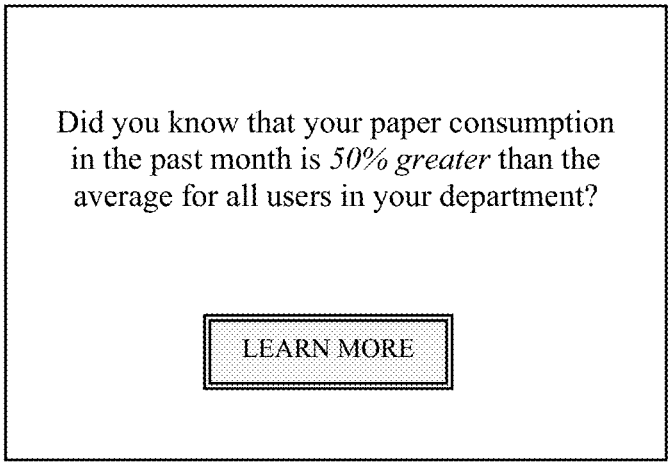
Figure 16B:
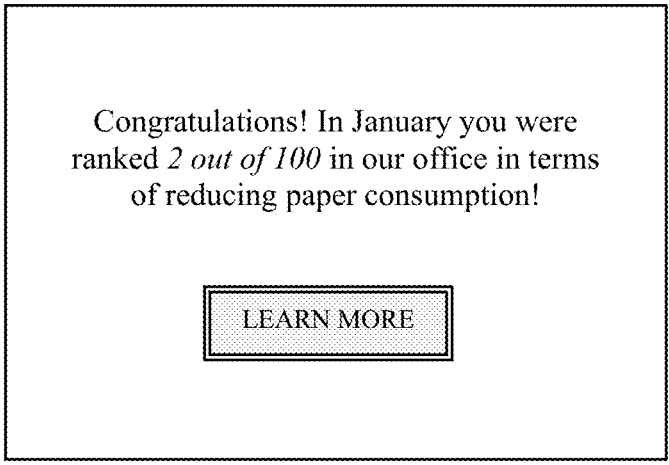

According to an exemplary embodiment, the motivational message displayed by the document processing apparatus 100 may include a motivational or encouraging message based on the usage history information of one or more users. Any motivational message based on statistics derived from usage history information may be utilized. For example, the processing part 100a may determine a user-specific consumption level based on historical usage of resources by the particular user, and determine an average consumption level based on usage history of a plurality of users. Thereafter as illustrated in the examples of FIGS. 16A and 16B, the message displayed by the apparatus 100 may compare the user-specific consumption level to the average consumption level over a particular time period (represented with percentages, fractions or ranks, for example). The other users could be any plurality of users, such as all the users in a particular enterprise, organization, department, division, office, building, etc. Thus, the user may be encouraged to conserve resources, by comparing their efforts with those of their colleagues. The processing part 100a may access the usage history information, such as that illustrated in the table of FIG. 15, to aid in generating these messages.

As another example, the processing part 100a may determine a first user-specific consumption level based on usage history of the particular user in a first-time period (e.g. a day, a week, a month, etc.), and determine a second user-specific consumption level based on usage history of the particular user in a second time period (e.g. another day, another week, another month, etc.). Thereafter as illustrated in the example of FIGS. 16C and 16D, the motivational message may compare the first user-specific consumption level with the second user-specific consumption level (represented with percentages, fractions or ranks, for example). The processing part 100a may access the usage history information, such as that illustrated in the table of FIG. 15, to aid in generating these messages.

The identity of the current user may be determined based on user identification, authentication and/or password information provided by the user when the user is operating a control panel of the document processing apparatus 100, or which is received from the user's terminal via a network when the user requests the output job from that terminal. Alternatively, the user may have an ID card including an RFID tag on their person, and when the user approaches the document processing apparatus 100, an RFID reader/scanner of the apparatus 100 may access the information on the RFID tag of the user's ID card to determine the identity of the user.

Figure 17A:
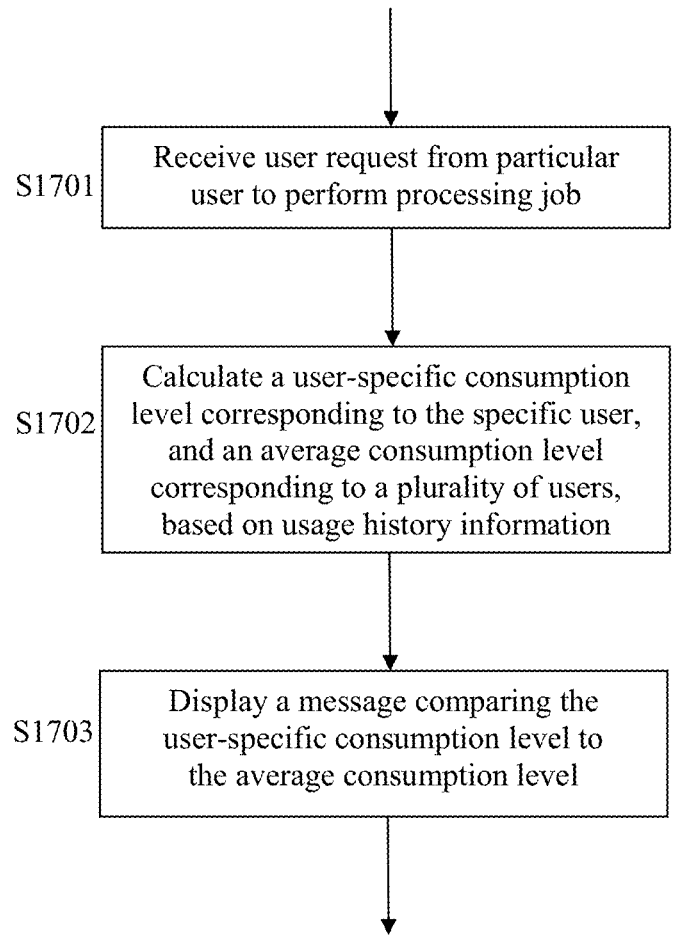
FIG. 17A shows a flowchart of a method performed by a document processing apparatus or part, such as document processing apparatus 100 illustrated in FIG. 1A, according to an exemplary embodiment.

Turning now to FIG. 17A, there is shown a flowchart of a method performed by a document processing apparatus, such as document processing apparatus 100 illustrated in FIG. 1A, according to this exemplary embodiment.

In S1701, the document processing apparatus receives a request from a particular user to perform a specific processing job and job settings corresponding to the specific processing job. Then in S1702, the document processing apparatus calculates a user-specific consumption level corresponding to the specific user determined in S1701, and an average consumption level corresponding to a plurality of users, based on usage history information. An example of a table registering usage history information is illustrated in FIG. 15. In S1703, the document processing apparatus displays a message comparing the user-specific consumption level to the average consumption level. An example of such a message is illustrated in FIGS. 16A and 16B.

Figure 17B:
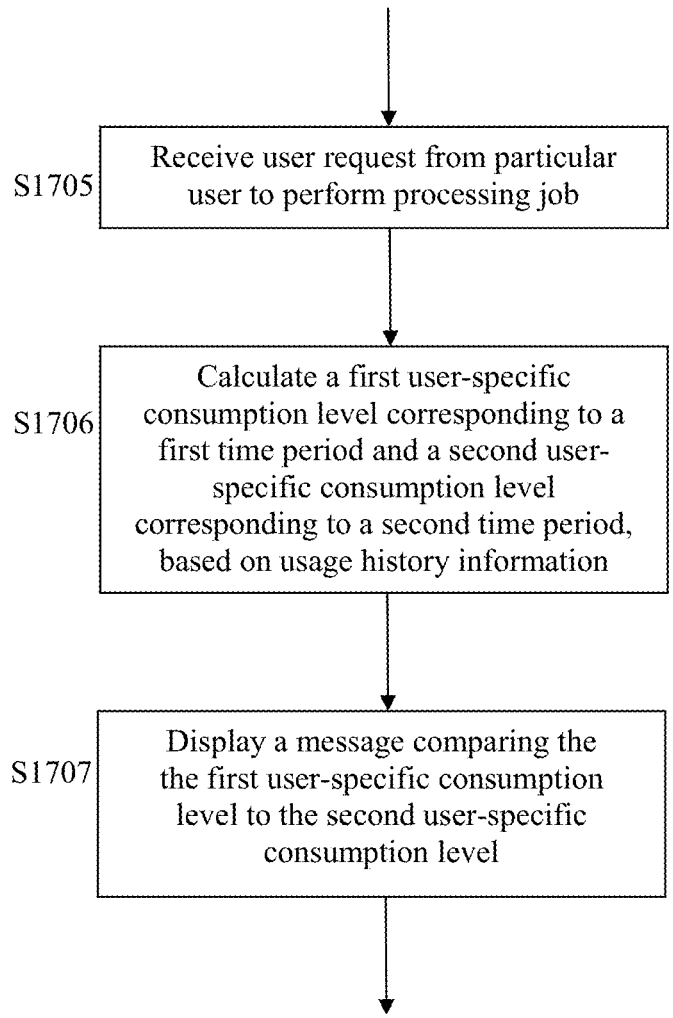
FIG. 17B shows a flowchart of a method performed by a document processing apparatus or part, such as document processing apparatus 100 illustrated in FIG. 1A, according to an exemplary embodiment.

In FIG. 17B, there is shown a flowchart of another method performed by a document processing apparatus, such as document processing apparatus 100 illustrated in FIG. 1A, according to this exemplary embodiment.

In S1705, the document processing apparatus receives a request from a particular user to perform a specific processing job and job settings corresponding to the specific processing job. In S1706, the document processing apparatus calculates a first user-specific consumption level corresponding to a first time period and a second user-specific consumption level corresponding to a second time period, based on usage history information. An example of a table registering usage history information is illustrated in FIG. 15. In S1703, the document processing apparatus displays a message comparing the first user-specific consumption level to the second user-specific consumption level. An example of such a message is illustrated in FIGS. 16C and 16D.

According to the embodiments described above, when the user clicks on the 'Learn More' button in the motivating message (examples of which are illustrated in FIGS. 6A-6D and FIGS. 16A-16B), the user is presented with the user interface screens of FIG. 11 and/or FIG. 12, for example. According to another embodiment, when the user clicks on the 'Learn More' button, the user is instead or in addition presented with a user interface screen that summarizes the usage history information for that user and summarizes average usage history of a plurality of users. The information may be obtained from a table registering the usage history information, such as that illustrated in FIG. 15.

Figure 18A:
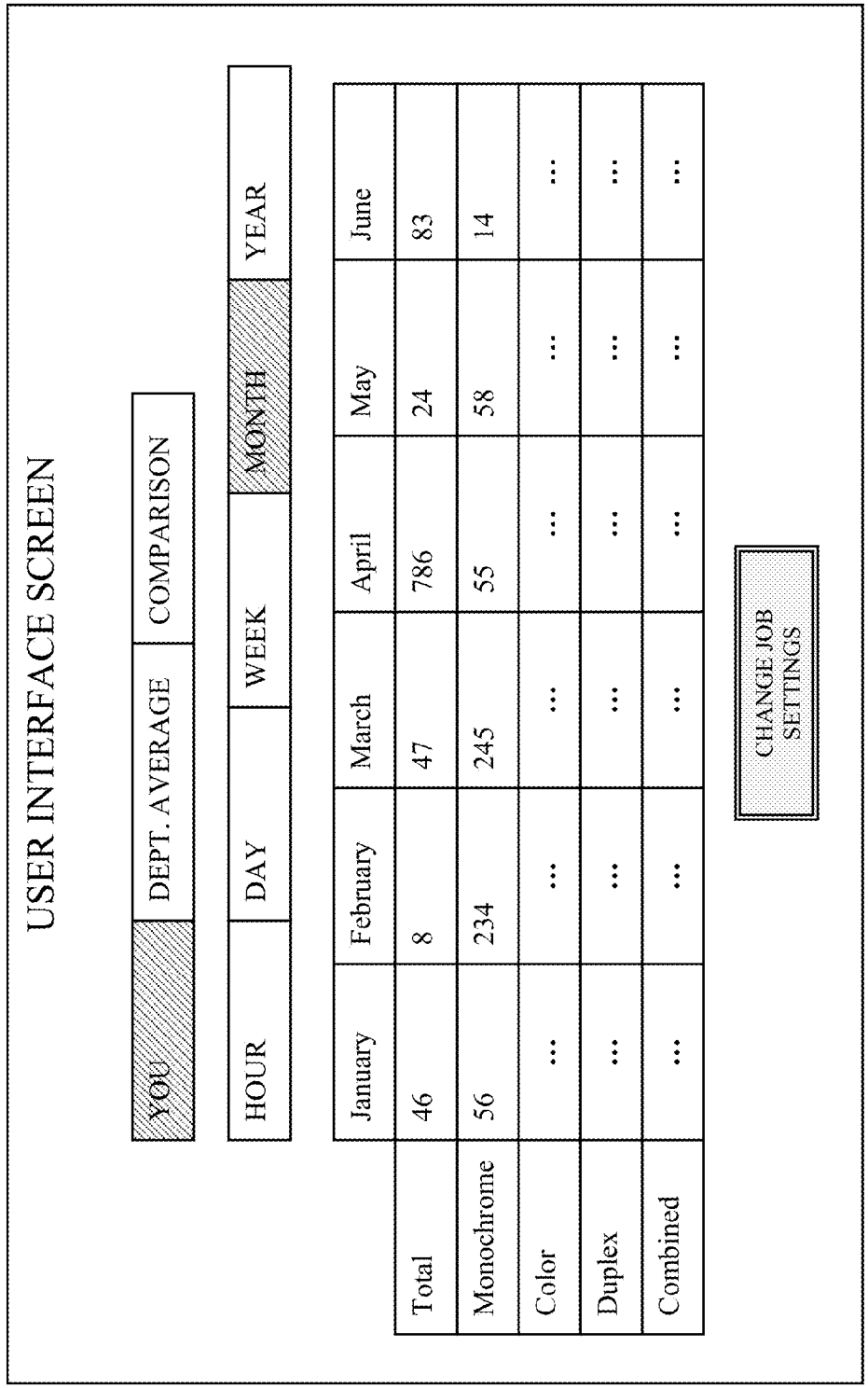
FIGS. 18A and 18B illustrate examples of user interface screens caused by a document processing apparatus, such as document processing apparatus 100 depicted in FIG. 1A, to be displayed.

For example, the processing part 100*a* may cause the user interface part 100*b* to display the user interface screen illustrated in FIG. 18A, which allows the user to view their usage history information as well as average usage information for a plurality of users. If the user clicks on the 'You' tab/button, the user may then select a time period by clicking on one of the time period organizer tabs/buttons (e.g. 'Day, 'Month', 'Week', etc.). The user interface screen will then display the usage history information for the user, as sorted by the selected time period (e.g. by month). As seen in FIG. 18A, the usage history information may include the total number of pages output by the user, as well as the number of monochrome or color pages output, duplex pages output, combined print pages output, and so forth in each time period. Similarly, if the user clicks on the 'Dept. Average' tab/button, the user may then select a time period by clicking on one of the time period organizer buttons (e.g. 'Day, 'Month', 'Week', etc.). The user interface screen will then display the usage history information similar to that illustrated in FIG. 18A, except the usage history information will be the average amount of pages output by a plurality of users, as sorted by the selected time period. The plurality of users could be any plurality of users, such as all the users in a particular enterprise, organization, department, division, office, building, etc.

Figure 18B:
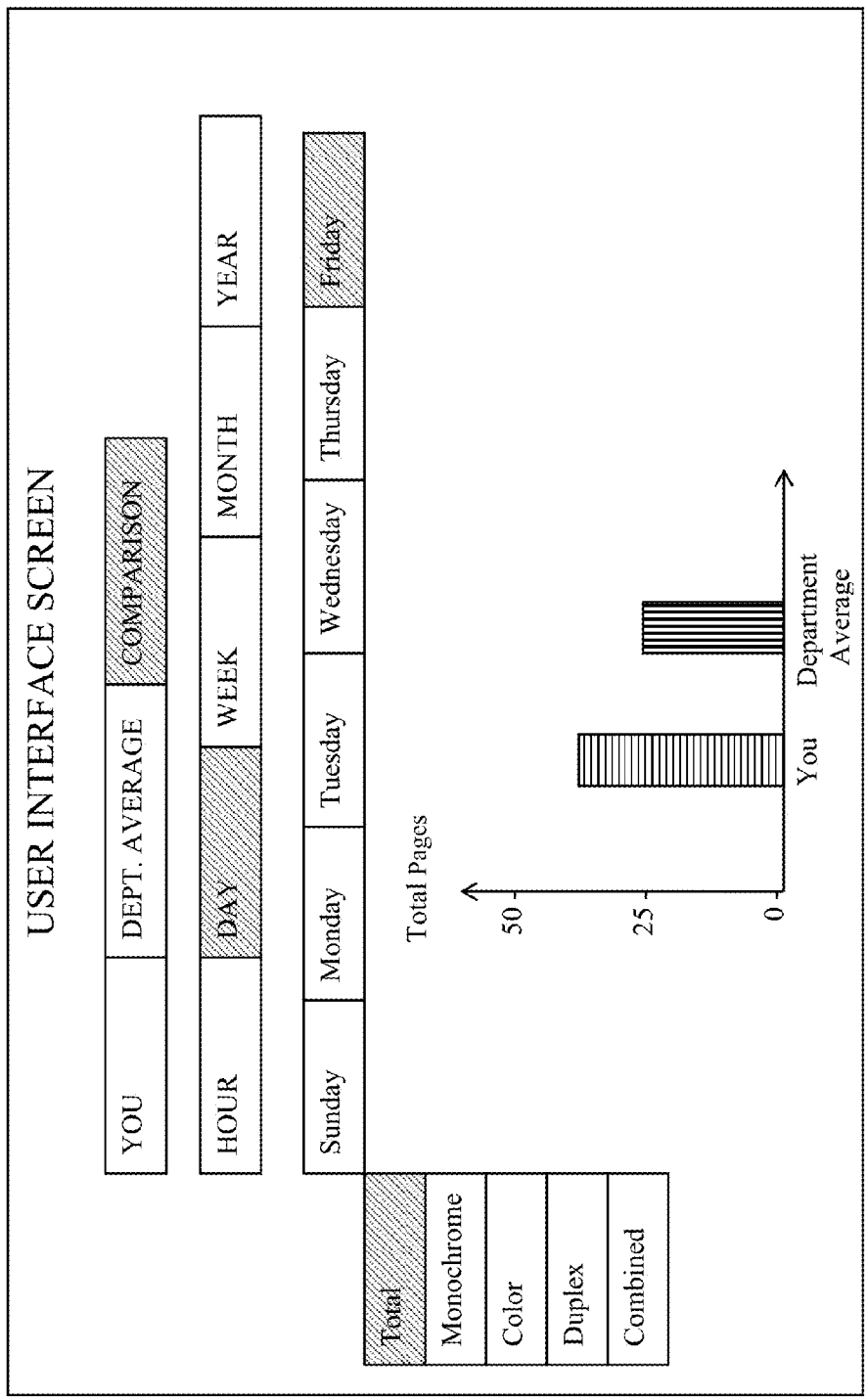

Further, if the user clicks on the 'Comparison' button/tab, the user may be presented with the user interface screen illustrated in FIG. 18B, which shows a comparison between paper consumed by the user and the department average for consuming paper. The user interface screen of FIG. 18B allows the user to select a time period organizer (e.g. 'Day', 'Month', etc.), and select a time period (e.g. 'Today', 'Friday', 'Last Month', etc.) and to select features of the page data considered in the comparison analysis (e.g. 'Total', 'Monochrome', 'Duplex', etc.).

The information illustrated in FIGS. 18A and 18B is merely exemplary, and the usage history information and comparison data is not limited to that illustrated in FIGS. 18A and 18B. Any other type of statistical data derived from the usage history logs may be presented to the user. For example, statistical trends, comparisons and analysis based on usage history information and related to the conservation of resources may displayed to the user, such as how much resources have been saved by certain actions, and how much more could be saved if these actions are continued. Moreover, the aspects of this embodiment can be applied to usage history information about consumables other than paper, such as toner, electricity, energy, emissions, etc, and the user interface part 100*b* may display such information to the user. For example, the user interface part may inform the user of how many trees have been saved by the user and/or their department in a particular time period.

When the user clicks on the 'Change Job Settings' button in FIG. 18A, the user may be presented with the user interface screen illustrated in FIG. 12, for example, in order select new job settings for the current output job.

Figure 19:
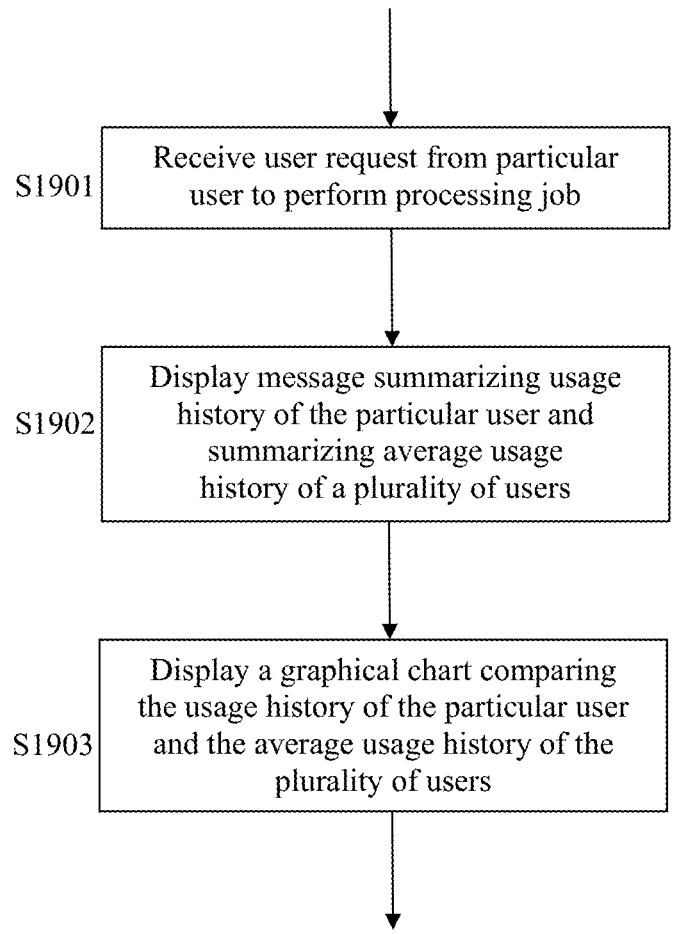
FIG. 19 shows a flowchart of a method performed by a document processing apparatus or part, such as document processing apparatus 100 illustrated in FIG. 1A, according to an exemplary embodiment.

In FIG. 19, there is shown a flowchart of a method performed by a document processing apparatus, such as document processing apparatus 100 illustrated in FIG. 1A, according to this exemplary embodiment.

In S1901, the document processing apparatus receives a request from a particular user to perform a specific processing job and job settings corresponding to the specific processing job. Then in S1902, the document processing apparatus displays summarizing usage history information corresponding to the particular user and summarizing average usage history information corresponding to a plurality of users. An example of such a user interface screen displayed by the document processing apparatus is illustrated in FIG. 18A. In S1903, the document processing apparatus displays a graphical chart comparing the usage history corresponding to the particular user and the average usage history corresponding to the plurality of users. An example of such a user interface screen displayed by the document processing apparatus is illustrated in FIG. 18B.

Turning now to FIGS. 20-25, there is described other exemplary embodiments of this disclosure.

According to an exemplary embodiment, the user interface part 100*b* receives a user to request change current settings of the document processing apparatus to other settings for the document processing apparatus. For example, the user interface part 100*b* may display the user interface screen illustrated in FIG. 20, which allows the user to change the general apparatus settings, such as setting a mode corresponding to monochrome, color, draft quality, normal quality, best quality, etc. When the user requests change of the current settings of the document processing apparatus to other job settings, the processing part determines whether there is an increase in power to be consumed in a case that the document processing apparatus operates based on the other job settings, as compared to a case that the document processing apparatus operates based on the current job settings. For example, the apparatus 100 may store information such as that illustrated in FIG. 21, which depicts the amount of power (units/year) consumed when the apparatus is set to a particular setting, assuming the performance of an average of a certain number of jobs per day (e.g. 30 jobs/day, 60, jobs/day, 120 jobs/day, etc.). Based on the information illustrated in FIG. 21, the processing part 100*a* may determine whether there is an increase in power to be consumed in a case that the document processing apparatus operates based on the other job settings, as compared to a case that the document processing apparatus operates based on the current job settings. For instance, if the current job setting is draft quality, and the other job setting is best quality, the processing part 100a may determine that there is an increase in power to be consumed in a case that the document processing apparatus operates in best quality mode, as compared to a case that the document processing apparatus operates in draft quality mode.

In a case that the processing part 100a determines that the other settings cause an increase in power consumption, then the processing part, before applying the user-specified other settings, causes the user interface part 100b to output a warning message indicating that changing to the other settings requested by the user will cause greater consumption of power as compared to the current settings. An example of such a user interface screen is illustrated in FIG. 22.

Thus, according to this exemplary embodiment, when the user of the apparatus 100 wishes to change one or more settings of the apparatus, the apparatus may respond by warning the user of the effect on power consumption that may result due to the changes. Thus, the user can be made more aware of the consequences of their choices, and can be assisted in their efforts to conserve power and other resources.

Figure 23:
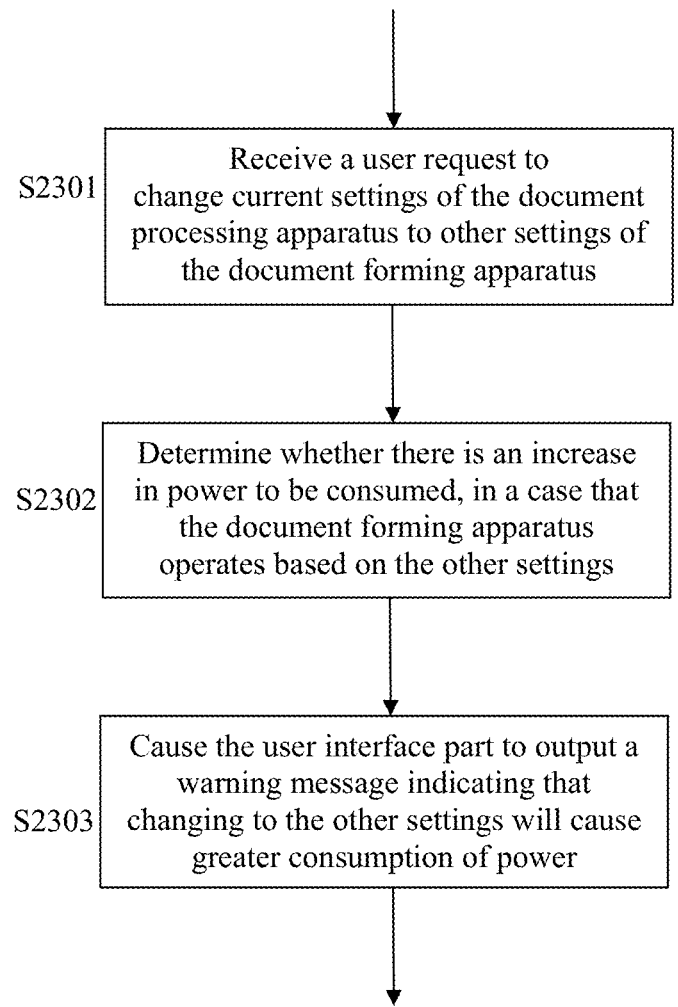
FIG. 23 shows a flowchart of a method performed by a document processing apparatus or part, such as document processing apparatus 100 illustrated in FIG. 1A, according to an exemplary embodiment.

In FIG. 23, there is shown a flowchart of a method performed by a document processing apparatus, such as document processing apparatus 100 illustrated in FIG. 1A, according to this exemplary embodiment.

In S2301, the document processing apparatus receives a user request to change current settings of the document processing apparatus to other settings for the document processing apparatus. For example, the apparatus may display the user interface screen illustrated in FIG. 20 to receive the user request to change the settings of the apparatus. In S2302, the apparatus determines that there is an increase in power to be consumed in a case that the document processing apparatus operates based on the other job settings, as compared to a case that the document processing apparatus operates based on the current job settings. Finally, in S2303, the apparatus causes a user interface part to output a warning message indicating that changing to the other settings requested by the user will cause greater consumption of power, as compared to the current settings. An example of such a message is illustrated in FIG. 22.

According to another exemplary embodiment, the document processing apparatus 100 may include a sleep mode (also known as power saving mode, hibernate mode, standby mode, inactivity mode, etc.), wherein one or more parts or components of the apparatus 100 are deactivated or placed in a low-power mode when the apparatus is not in use. The sleep mode may be triggered when a specified time period has elapsed since the apparatus last executed an output job. According to this exemplary embodiment, when a user of the document processing apparatus 100 desires to change the conditions for triggering sleep mode (such as the time period of inactivity required before the apparatus enters sleep mode), the document processing apparatus displays information regarding electricity consumption and electricity cost based on the old settings and the new settings.

For example, the apparatus may first display a user interface screen configured to receive user selection of sleep mode settings, such as selection of the time period of inactivity required to enter sleep mode. If the apparatus receives a user request to change the sleep mode conditions from old settings (e.g. enter sleep mode after 1 min of inactivity), to new settings (e.g. enter sleep mode after 15 minutes of inactivity), the device may display the user interface screen shown in FIG. 24 for example. The screen of FIG. 24 includes comparative data for annual electricity consumption information (kWh/year/unit) and annual electricity cost information ($/year/unit) for a plurality of job patterns and print volumes. In particular, for each job pattern & print volume (shown in the leftmost column), the annual electricity consumption for the old factory settings of 1 min of inactivity before sleep (Case A) and the new settings of 15 min of inactivity before sleep (Case B) are displayed, as is [Case B-Case A] data. Similarly, for each job pattern & print volume (shown in the leftmost column), the annual electricity cost for the old factory settings of 1 min of inactivity before sleep (Case A) and the new settings of 15 min of inactivity before sleep (Case B) are displayed, as is [Case B-Case A] data and [Case B/Case A] data.

Figure 24:
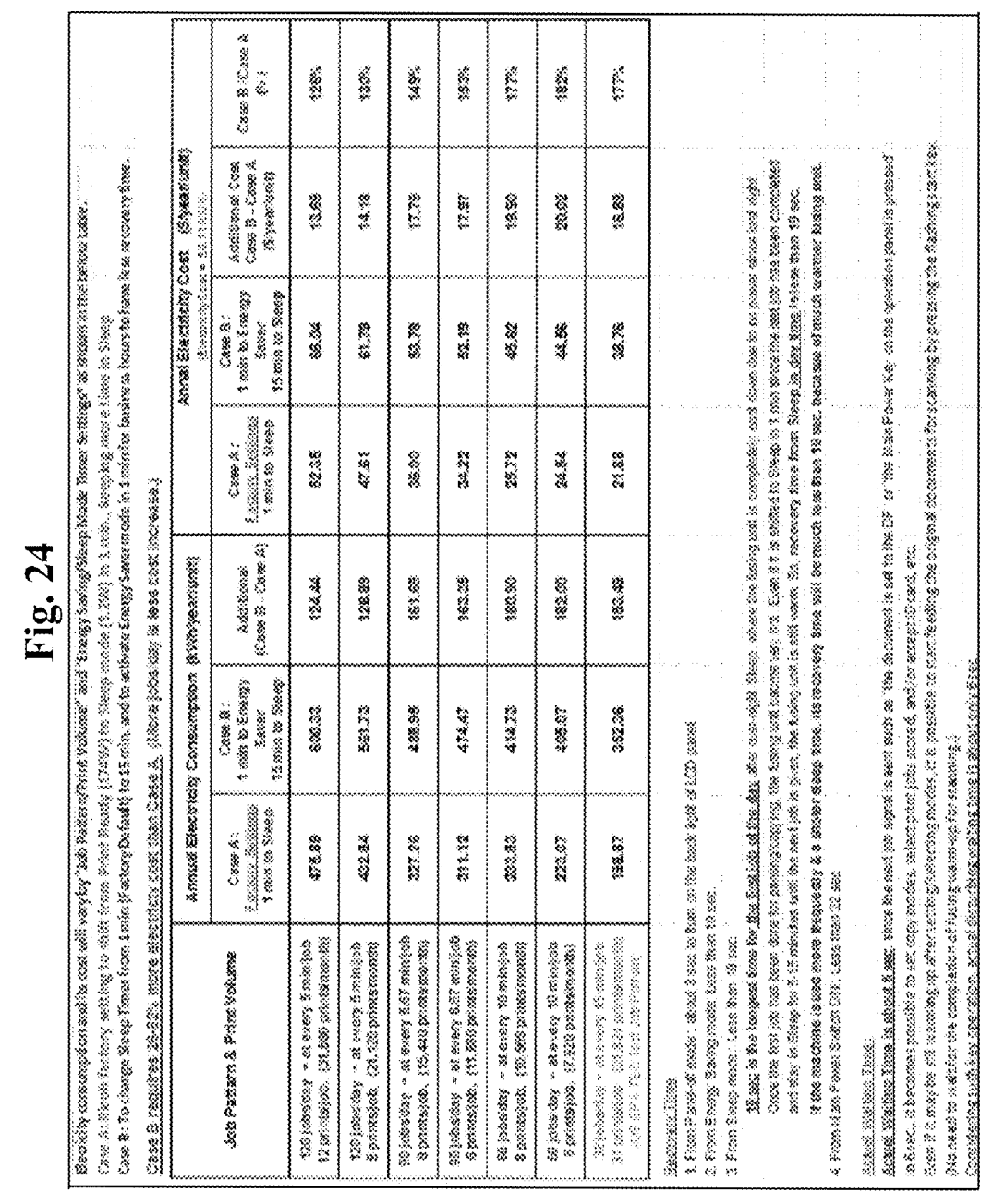

The information included in the user interface screen displayed in FIG. 24 is merely exemplary, and other comparative information comparing aspects of the old device settings to aspects the new device settings may be displayed to a user. For example, the recovery time from exiting from sleep modes and the actual wait time between jobs may be included. The electricity consumption information and electricity cost information may be supplied by a manufacturer of a device, or may be generated based on usage history information collected by the document processing apparatus 100 over a period of time.

After viewing the information illustrated in FIG. 24, the user may be provided with the option of continuing to change the old device settings to the new device settings, or keeping the old device settings. Thus, according to this embodiment the user can determines the benefits in terms of conserving paper, toner, electricity, emissions, costs and other resources, for each of various settings of a document processing apparatus in real-time.

Figure 25:
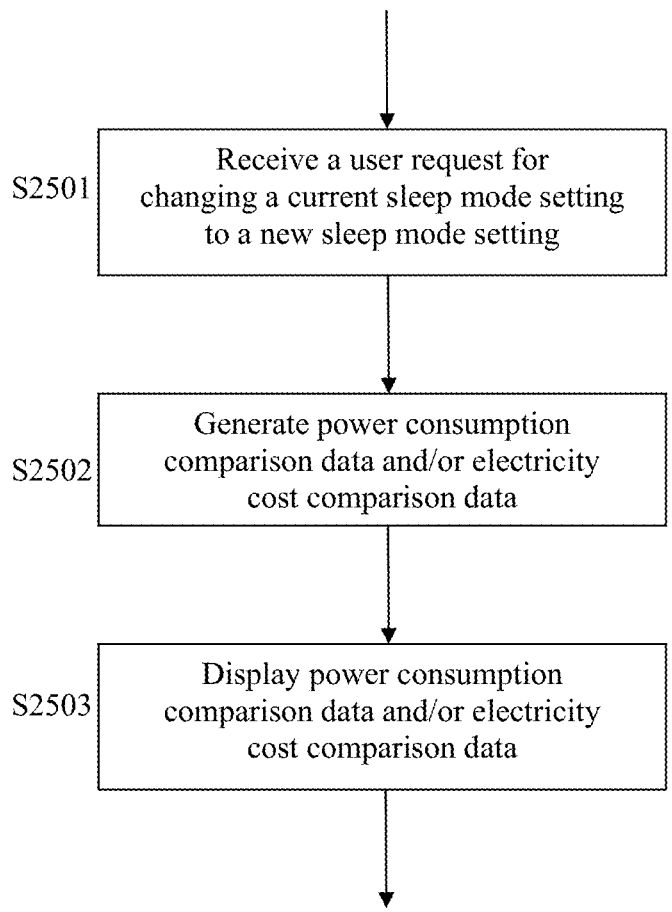
FIG. 25 shows a flowchart of a method performed by a document processing apparatus or part, such as document processing apparatus 100 illustrated in FIG. 1A, according to an exemplary embodiment.

In FIG. 25, there is shown a flowchart of a method performed by a document processing apparatus, such as document processing apparatus 100 illustrated in FIG. 1A, according to this exemplary embodiment.

In S2501, the document processing apparatus receives a user request for changing a current sleep mode setting to a new sleep mode setting. Then in S2502, the document processing apparatus generates power consumption comparison data indicating power consumption information corresponding to the current sleep mode setting and power consumption information corresponding to the new sleep mode setting. Instead, or in addition, the document processing apparatus may generate electricity cost comparison data indicating electricity cost information corresponding to the current sleep mode setting and electricity cost information corresponding to the new sleep mode setting. In S2503, the document processing apparatus displays the power consumption comparison data and/or electricity cost comparison data generated in S2502. An example of a user interface screen displayed by the document processing apparatus, which includes power consumption comparison data and electricity cost comparison data, is illustrated in FIG. 24.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A job processing system including plural resources, to perform print or copy operations, said system comprising a processor and a non-transitory medium embodying a program of instructions executable by the processor to configure the system to include:

a job processing part that
  receives an instruction to perform a specific print job or copy job from a user, receives specific job settings for the specific print job or copy job, and determines total amounts of time and resources to be consumed in a case that the specific print job or copy job is performed based on the received job settings, and
  determines alternative job settings to obtain savings in time and calculates total amounts of savings in time to be consumed in a case that the specific print job or copy job is performed with the alternative job settings determined by the job processing part applied to the specific print job or copy job, in place of the received job settings; and
a user interface part that outputs to the user a message, before the specific print job or copy job is performed, indicating the alternative job settings to be recommended to be applied to the specific print job or copy job, in place of the received job settings, and also indicating the total amounts of savings of time in the case that the specific print job or copy job is performed with the alternative job settings determined by the job processing part, and allows the user to select to apply said alternative job settings determined by the job processing part, in place of the received job settings, for the specific print job or copy job,
wherein the total amounts of savings in time to be consumed in a case that the specific print job or copy job is performed with the alternative job settings is calculated without user control and prior to the user interface part outputting a message indicating the alternative job settings, and
wherein when the job processing part receives a request from the user to perform a specified print job or copy job, the job processing part determines a user-specific print resource consumption level based on historical usage of print resources corresponding to print jobs or copy jobs submitted by the user and determines an average print resource consumption level based on historical usage of print resources corresponding to print jobs or copy jobs submitted by a plurality of users, and the user interface part outputs a message comparing the user-specific print resource consumption level of the user to the average print resource consumption level of the plurality of users.

2. The system of claim 1, wherein when the job processing part receives the job settings for an output job, the job processing part calculates additionally at least one of a paper consumption amount and a toner consumption amount, based on the received job settings.

3. The system of claim 2, wherein
the user interface part is configured for the user to request a change of the current job settings for the output job to new job settings, and
the user interface part outputs, before applying the change requested by the user, a message comparing (a) the amounts of resources to be consumed in a case that the output job is performed based on the new job settings and (b) the amounts of resources to be consumed in a case that the output job is performed based on the current job settings.

4. The system of claim 1, wherein
when the job processing part receives a request from the user to perform a specific processing job and job settings corresponding for the specific processing job, the job processing part determines a first user-specific consumption level based on usage history of the user in a first time period and determines a second user-specific consumption level based on usage history of the particular user in a second time period, and the user interface outputs a message comparing the first user-specific consumption level to the second user-specific consumption level.

5. The system of claim 1, wherein
when the job processing part receives a request from the user to perform a specific processing job and job settings corresponding for the specific processing job, the user interface outputs a message summarizing usage history of the user and summarizing average usage history of a plurality of users is output.

6. The system of claim 5, wherein the interface part displays a graphical chart comparing said usage history of the user and said average usage history of the plurality of users.

7. The system of claim 1, wherein
the user interface part is configured for the user to request a change of current settings of a document processing apparatus to other settings for the document processing apparatus, and
when the user requests, through the user interface, change of the current settings of the document processing apparatus to said other job settings, the job processing part determines whether there is an increase in power to be consumed in a case that the document processing apparatus operates based on said other job settings, as compared to a case that the document processing apparatus operates based on the current job settings, and
in a case that the job processing part determines that said other settings cause an increase in power consumption, the job processing part, before applying the user-specified other settings, causes the user interface part to output a warning message indicating that changing to said other settings requested by the user will cause greater consumption of power as compared to the current settings.

8. The system of claim 1, wherein when the user requests, through the user interface, change from a current sleep mode setting to a new sleep mode setting, the job processing part generates electricity cost comparison data indicating electricity cost information corresponding to the current sleep mode setting and electricity cost information corresponding to the new sleep mode setting, and the user interface part displays said electricity cost comparison data.

9. The system of claim 1, wherein when the user requests, through the user interface, change from a current sleep mode setting to a new sleep mode setting, the job processing part determines power consumption comparison data indicating power consumption information corresponding to the current sleep mode setting and power consumption information corresponding to the new sleep mode setting, and the user interface part outputs said power consumption comparison data.

10. A method, performed by a job processing apparatus, for monitoring consumption of resources, said method comprising:
  receiving an instruction to perform a specific print job or copy job and specific job settings for the specific print job or copy job;
  determining, by the job processing apparatus, one or more total amounts of resources to be consumed in a case that the specific print job or copy job is performed based on the specific job settings;
  determining, by the job processing apparatus, alternative job settings and calculating one or more total amounts of savings in resources to be consumed in a case that the specific print job or copy job is performed based on the alternative job settings determined by the job processing apparatus in place of the received job settings;

outputting, by the job processing apparatus, to a user a message on a user interface, before the specific print job or copy job is performed, indicating the alternative job settings, indicating the total amounts of savings of resources in the case that the specific print job or copy job is performed based on the alternative job settings determined by the job processing apparatus, and allowing the user to select said alternative job settings, in place of the specific job settings, for the specific print job or copy job; and receiving a request from the user to perform a specified print job or copy job, determining a user-specific print resource consumption level based on historical usage of print resources corresponding to print jobs or copy jobs submitted by the user and determining an average print resource consumption level based on historical usage of print resources corresponding to print jobs or copy jobs submitted by a plurality of users, and outputting a message comparing the user-specific print resource consumption level to the average print resource consumption level of the plurality of users, wherein the total amounts of savings in resources to be consumed in a case that the specific print job or copy job is performed with the alternative job settings is calculated without user control and prior to the user interface outputting a message indicating the alternative job settings.

11. The method of claim 10, further comprising:
receiving job settings for an output job;
calculating at least one of a paper consumption amount, a toner consumption amount, and
an output time amount, based on the received job settings for the output job;
receiving a user request to change the current job settings for the output job to new job settings; and
outputting, before applying the change requested by the user, a message comparing (a) the amounts of resources to be consumed in a case that the output job is performed based on the new job settings and (b) the amounts of resources to be consumed in a case that the output job is performed based on the current job settings.

12. The method of claim 10, further comprising:
receiving a request from the user to perform a specific processing job and job settings corresponding for the specific processing job;
determining a first user-specific consumption level based on usage history of the user in a first time period and determining a second user-specific consumption level based on usage history of the particular user in a second time period; and
outputting a message comparing the first user-specific consumption level to the second user-specific consumption level.

13. The method of claim 10, further comprising:
receiving a request from the user to perform a specific processing job and job settings corresponding for the specific processing job; and
outputting a message summarizing usage history of the user and summarizing average usage history of a plurality of users.

14. The method of claim 13, further comprising:
displaying a graphical chart comparing said usage history of the user and said average usage history of the plurality of users.

15. The method of claim 14, further comprising:
receiving a user request to change current settings of the job processing apparatus to other settings for the job processing apparatus;
determining that there is an increase in power to be consumed in a case that the job processing apparatus operates based on said other job settings, as compared to a case that the job processing apparatus operates based on the current job settings; and
before applying the user-specified other settings, causing the user interface part to output a warning message indicating that changing to said other settings requested by the user will cause greater consumption of power as compared to the current settings.

16. The method of claim 10, further comprising:
receiving a user request for changing a current sleep mode setting to a new sleep mode setting;
generating electricity cost comparison data indicating electricity cost information corresponding to the current sleep mode setting and electricity cost information corresponding to the new sleep mode setting; and
displaying said electricity cost comparison data.

17. The method of claim 10, further comprising:
receiving a user request for changing a current sleep mode setting to a new sleep mode setting;
generating power consumption comparison data indicating power consumption information corresponding to the current sleep mode setting and power consumption information corresponding to the new sleep mode setting; and
displaying said power consumption comparison data.

18. A job processing system including plural resources, said job processing system comprising a processor and a non-transitory medium embodying a program of instructions executable by the processor to configure the system to include:
a job processing part that
receives an instruction to perform a specific print job or copy job and receives specific job settings for the specific print job or copy job,
determines one or more total amounts of resources to be consumed in a case that the specific print job or copy job is performed based on the received job settings,
determines alternative job settings based on one or more of a data format of data of an input document, a job type of the specific print job or copy job and a usage history,
calculates total amounts of savings in resources to be consumed in a case that the specific print job or copy job is performed based on the alternative job settings in place of the received job settings; and
a user interface part configured to output to a user a message, before the specific print job or copy job is performed, indicating the alternative job settings determined by the job processing part based on said one or more of the data format of data of the input document, the job type of the specific print job or copy job and the usage history, and indicating the total amounts of savings of resources in the case that the specific print job or copy job is performed based on the alternative job settings, and allowing the user to select said alternative job settings, in place of the received job settings, for the specific print job or copy job,
wherein the total amounts of savings in resources to be consumed in a case that the specific print job or copy job is performed with the alternative job settings is calculated without user control and prior to the user interface part outputting a message indicating the alternative job settings, and wherein when the job processing part receives a request from the user to perform a specified print job or copy job, the job processing part determines a user-specific print resource consumption level based on historical usage of print resources corresponding to print jobs or copy jobs submitted by the user and determines an average print resource consumption level based on historical usage of print resources corresponding to print jobs or copy jobs submitted by a plurality of users, and the user interface outputs a message comparing the user-specific print resource consumption level to the average print resource consumption level of the plurality of users.

* * * * *